United States Patent
Shlomi et al.

(10) Patent No.: US 6,199,587 B1
(45) Date of Patent: Mar. 13, 2001

(54) SOLENOID VALVE WITH PERMANENT MAGNET

(76) Inventors: Franco Shlomi, 13 Soutine Street, Tel Aviv 64884; Joseph Rogozinski, 14 Moza Street, Ramat Gan 52386; Vychislav Ivanov, 14 Ha'iris Street, Kiryat Tivon 36083; Uri Arkashevski, 36 Vaad Arbs Arazot Street, Petach Tikva 49300, all of (IL)

(*) Notice: Subject to any disclaimer, the term of this patent is extended or adjusted under 35 U.S.C. 154(b) by 0 days.

(21) Appl. No.: 09/120,867

(22) Filed: Jul. 21, 1998

(51) Int. Cl.[7] ........................... F16K 11/044; F16K 31/08
(52) U.S. Cl. ................... 137/625.5; 137/625.65; 251/65; 251/129.1; 251/129.19
(58) Field of Search ................ 137/625.5, 625.65; 251/65, 129.1, 129.19

(56) References Cited

U.S. PATENT DOCUMENTS

| | | |
|---|---|---|
| 3,202,447 | 8/1965 | Whaley et al. . |
| 3,332,045 * | 7/1967 | Rodaway ............... 251/129.1 X |
| 3,977,436 * | 8/1976 | Larner ..................... 137/625.65 |
| 4,159,026 * | 6/1979 | Williamson ............ 137/625.65 X |
| 4,253,493 * | 3/1981 | English .................. 137/625.65 X |
| 4,295,111 | 10/1981 | Wang . |
| 4,306,589 | 12/1981 | Harned et al. . |
| 4,403,765 * | 9/1983 | Fisher .................... 137/625.65 X |
| 4,489,863 | 12/1984 | Horchos et al. . |
| 4,524,797 * | 6/1985 | Lungu .................... 137/635.65 X |
| 4,534,539 * | 8/1985 | Dettmann ........................ 251/65 |
| 4,561,632 | 12/1985 | Hugler . |
| 4,574,841 | 3/1986 | Hugler . |
| 4,690,371 | 9/1987 | Bosley et al. . |
| 5,280,806 | 1/1994 | Glazebrook . |
| 5,318,071 | 6/1994 | Gaiardo . |
| 5,345,968 | 9/1994 | Day . |
| 5,351,934 | 10/1994 | Jensen et al. . |
| 5,727,769 | 3/1998 | Suzuki . |

* cited by examiner

Primary Examiner—Gerald A. Michalsky
(74) Attorney, Agent, or Firm—Gottlieb, Rackman & Reisman, P.C.

(57) ABSTRACT

A solenoid valve comprises a first coil, a plunger, a first and a second opening in the valve, and a latching mechanism placed in association with the first opening. The latching mechanism causes latching, with a predetermined latching force, of the plunger to the first opening, and energization of the first coil along a predetermined first polarity causes at least a reduction of the latching force. The plunger has a first end towards the first opening and a second end towards the second opening, and a magnetic field extensor extends a first pole of the magnetic field produced by the first coil to the first end of the plunger. The extensor comprises a hollow cylindrical ferrous member terminated by a ferrous endpiece and is movable, with the plunger, relative to the first opening.

48 Claims, 18 Drawing Sheets

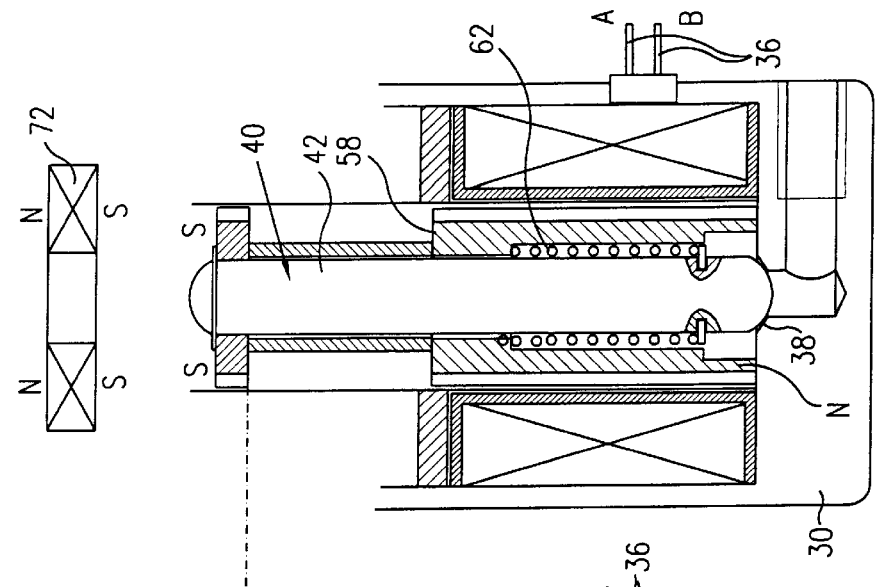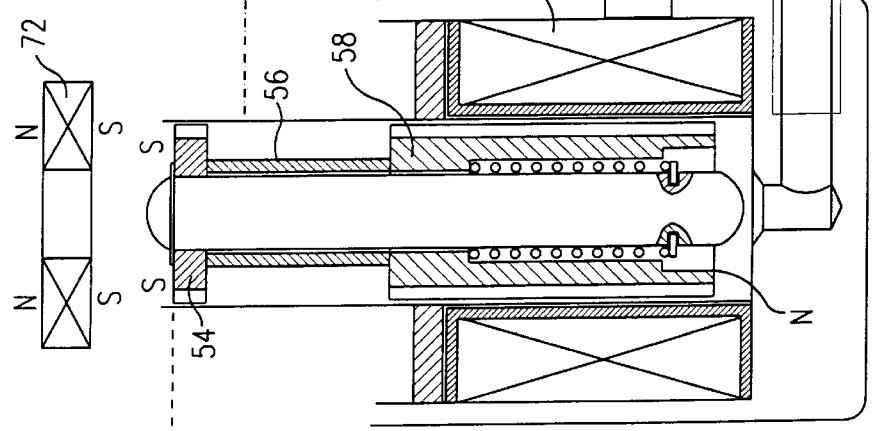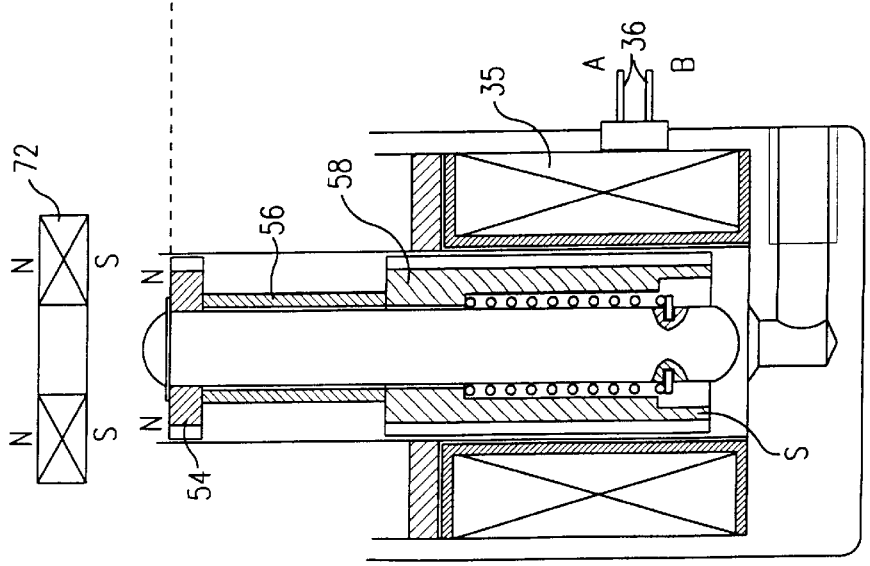

SOLENOID VALVE WITH PERMANENT MAGNET

FIELD OF THE INVENTION

The present invention relates to solenoid valves having permanent magnets.

BACKGROUND OF THE INVENTION

Solenoid valves having permanent magnets as biasing members are known inter alia from U.S. Pat. Nos. 3,202, 447, 4,306,589, 4,489,863, 4,561,632, 4,574,841, 4,690,371, 5,318,071, 5,345,968, and 5,351,934.

Conventional solenoid valves comprise three ports, a plunger biased by a spring into a first position, known as the normal position, in which it closes a first port and leaves a fluid path open through the remaining two ports. A solenoid surrounds the plunger, and the plunger essentially forms the core of a magnetic circuit comprising the plunger, the solenoid and further connecting parts of ferrous material, a gap being provided between the plunger and the entrance to one of the two open ports. When current is supplied to the solenoid the plunger moves against the bias of the spring to close the magnetic gap, and thus the first port, previously closed, is opened and one of the other ports is closed, to redirect the fluid path from the newly closed port to the newly opened port. This is the powered position and the valve can only remain in this state as long as the solenoid continues to be powered, otherwise it is returned to the normal position by the bias in the spring. In particular U.S. Pat. No. 5,727,769 discloses a valve which consists of a solenoid which drives a plunger in a yoke to open and close a valve part. A permanent magnet is peripherally positioned around the yoke in a predetermined position such that the magnetic field drives the plunger. The permanent magnet holds the plunger by the position of a groove part in the plunger. The magnetic field forms a loop facing the axial direction of plunger movement with a very short gap.

An advantage of this device is that the system restrains vibration of the plunger by making use of the eddy currents that are generated in proportion to the speed of the plunger. The device is able to achieve a rapid braking of the plunger at a predetermined position. This reduces impact damage on the plunger and thus improves the lifetime of the device.

A disadvantage with many of the devices mentioned above is the amount of energy usage. The solenoid coils are fairly thin and easily heated. A device of this kind may contain or be located very near plastic. In addition heating effects mean that the duty cycle of the device has to be kept below a certain maximum. Furthermore there are many applications in which it is preferable to keep electricity consumption to a minimum, for example in automatic irrigation equipment where the device may be left to operate for several hours a day over a large land area for the duration of the growing season. There are other application where it is essential to keep electricity consumption to a minimum, for example when the valve is located on portable equipment where the only power supply is a battery. Even valves on vehicles that include an alternator to generate electricity from the engine may be required to operate at times when the engine is not operational. For example valves that are part of a system for providing hot water to de-ice the outside of the vehicle are required to operate before the vehicle starts moving. Not only is their electric supply restricted to the vehicle battery but most of the available supply is needed to heat the water.

U.S. Pat. No. 5,727,769 discloses a solenoid valve in which a permanent magnet is placed outside the solenoid in order to damp the oscillation of the coil and thereby to enhance controllablity of the coil.

U.S. Pat. No. 4,295,769 discloses a solenoid valve in which a permanent magnet serves as a latch and in which a detaching coil is provided to generate a magnetic field which partially temporarily nullifies the magnetic field.

SUMMARY OF THE INVENTION

Embodiments of the present invention are designed to overcome these and other problems by providing a solenoid valve having a reversible latching mechanism which, in conjunction with magnetic fluxes of varying strengths provided within the valve in different directions at different times, creates forces to latch the valve in a given position and with reversal of magnetic flux, to force the valve out of the given position.

According to a first aspect of the present invention there is provided a solenoid valve comprising a first coil, a plunger, at least a first and a second opening and a latching mechanism placed in association with the first opening, wherein the latching mechanism causes latching, with a predetermined lathing force, of the plunger to the first opening and energization of the first coil in a predetermined first polarity causes at least a reduction of the latching force.

In an embodiment the latching mechanism comprises a permanent magnet placed in association with the first opening, which permanent magnet serves to provide the latching force, which force is directed towards the first opening, and wherein the first coil is operable to bring about the reduction in the latching force and to pull the plunger towards the second opening.

Preferably the first coil is operable to cancel out the latching force completely. Alternatively, the first coil is operable to change the latching force into a bias towards the second opening.

The solenoid valve may have a third opening, and fluid paths interruptible by the plunger, between the first opening and the third opening and between the second opening and the third opening.

The first coil is preferably remote from the first end of the plunger and a magnetic field extensor may be provided to extend a first pole of the magnetic field produced to the first end of the plunger.

In order to push the plunger away from the latched position, the first pole of the magnetic field produced by the first coil may be of the same polarity as a facing pole of the permanent magnet.

The first coil preferably acts upon an iron core to force the iron core towards the second opening when the first coil is in an energized state. The plunger is connected to the iron core by a biasing connector, for example a spring, and the spring is operative to bias the plunger towards the second opening.

The magnetic field extensor may comprise a hollow cylindrical member of ferrous material terminated by a ferrous endpiece. It may be a single part integral with the core.

The ferrous endpiece may be a ring, and may be mobile with the plunger.

The shape of the ferrous ring or the hollow cylindrical member may be modified and gaps therein may be added or adjusted in order to alter the strength of the magnetic field that appears at the ferrous ring.

The first coil preferably acts upon an iron core to force the iron core towards the second opening when the first coil is in an energized state. The plunger may be connected to the iron core by a biasing connector, and the biasing connector may be operative to bias the plunger against the core towards the second opening.

In an embodiment the hollow cylindrical member is axially slidable with respect to the core. This is preferably done in such a way that flux is able to pass as near as possible unchanged to form an efficient magnetic circuit.

The plunger may be further connected to the iron core by a second biasing connector, and the second biasing connector may be attached to bias the core downwardly with respect to the plunger such that when both plunger and core are moving upwardly and upward motion of the plunger is arrested suddenly, the two biasing connectors are operable to cause a cushioned deceleration of the core. Likewise, when the core is moving downwardly and the downward motion of the core is arrested, the first biasing member may cause downward motion of the plunger.

The biasing connectors may be coiled springs whose characteristics are optimized for any required load.

In a preferred embodiment a second parameter magnet is provided.

Preferably the characteristics of the two biasing connectors are preselected to reduce impact damage to the plunger and to the seats.

Preferably, excitation of the coil is controlled by a microcontroller.

The microcontroller can be programmed to energise each of the coils separately, that is to say using time delays that are of different duration and even that begin at different times. This allows for improvements in the efficiency of use of the device and allows a better duty cycle.

In an alternative embodiment the first coil is placed in association with said first opening and the latching mechanism comprises a magnet mounted on said plunger.

Preferably the first coil is energisable in a second polarity to increase the latching force.

A second coil may be provided about the plunger, energisable to draw the plunger towards the second opening.

Energisation of the coils may be provided using a three-way switch connected directly to the second coil and via diodes to the first coil, the arrangement permitting in a first switching position, energisation of the first coil alone in a first direction, in a second switching position, energisation of the first coil and the second coil both in a second direction and in a third position not permitting energisation of either coil.

In this latter embodiment the magnet may be a permanent magnet mounted on the first end of the plunger.

The solenoid valve preferably has a housing. The first coil may be mounted on the housing around the first opening and may be operable upon energisation in a first polarity to produce a pole facing said permanent magnet which is of the same polarity as a pole produced by the permanent magnet facing the coil, thereby pushing said plunger towards the second opening. Likewise, upon energisation in a second polarity it is operable to produce a pole facing said permanent magnet which is of the opposite polarity to the pole produced by the permanent magnet facing the coil, thereby pushing the plunger towards the first opening.

Preferably the second coil acts upon an iron core to force the iron core towards the second opening when the second coil is in an energized state, wherein the plunger is connected to the iron core by a biasing connector, and wherein the biasing connector is operative to bias the plunger against the core towards the second opening.

A magnetic field extensor may be provided to extend the magnetic field of the first coil towards the first opening.

The plunger may further be connected to the iron core by a second biasing connector which may bias the core downwardly with respect to the plunger such that when both plunger and core are moving upwardly and upward motion of the plunger is arrested suddenly, the two biasing connectors are operable to cause a cushioned deceleration of the core. Likewise when the core is moving downwardly and the downward motion of the core is arrested, the first biasing member is operable to cause downward motion of the plunger.

In a preferred embodiment, excitation of the coils is controlled by a microcontroller. The microcontroller is programmable and may contain a plurality of prestored programs for controlling operation of the valve. The microcontroller may in turn be controllable by a computer, or individual programs may be selected using external switches, e.g. dip switches, mounted on the microcontroller. The microcontroller may be a PWM controller. The microcontroller may provide closed loop for any of the following—temperatures of the coils, fluid pressure in at least one of the ports and flow rate of fluid within the fluid paths.

The microcontroller may provide timing control for excitation of the coils, wherein the timing control includes the introduction of time delays into the operation of each coil and wherein the time delays are the same for each coil.

The microcontroller is operable to provide timing control for excitation of the coils, wherein the timing control includes the introduction of time delays into the operation of each coil and wherein the time delays are different for each coil.

The polarity of each coil is preferably reversible.

Preferably the excitation of the coil is variable. This may easily be achieved by altering the electrical supply. Thus the excitation may be increased or decreased as necessary.

Temperature sensors may be provided on the coils and externally to the valve.

According to a second aspect of the present invention there is provided an automatically resettable shock absorber comparison a first coil, a plunger, at least a first and a second opening in said shock absorber, and a latching mechanism placed in association with the first opening, wherein the latching mechanism causes latching, with a predetermined latching force, of the plunger to the first opening and energisation of the first coil along a predetermined first polarity causes at least a reduction of the latching force.

According to a third aspect of the present invention there is provided a relay comprising a first coil, a plunger having a first end and a second end, and first and second resting positions of said plunger, and a latching mechanism placed in association with the first end of the plunger in the first resting position, wherein the latching mechanism causes latching, with a predetermined latching force, of the plunger in the first resting position and energisation of the first coil along a predetermined first polarity causes at least a reduction of the latching force, and wherein the plunger comprises an extension for transmitting movement to an external electrical switching element. Thus the actuator is able to serve as a relay switching device.

According to a fourth aspect of the present invention there is provided an actuator comprising a first coil, a plunger having a first end and a second end, and first and second resting positions of said plunger, and a latching mechanism placed in association with the first end of the plunger in the first resting position, when the latching mechanism causes latching, with a predetermined latching force, of the plunger in the first resting position and energisation of the first coil along a predetermined first polarity causes at least a reduction of the latching force, and wherein the plunger comprises an extension for transmitting force to external objects.

The above embodiments may allow a more efficient design and use of valve than has been known heretobefore. This enables the manufacture of devices that are more efficient in their power consumption, and which can therefore be made smaller because less heat dissipation is required. Alternatively devices of the same size able to exert greater forces can be manufactured.

BRIEF DESCRIPTION OF THE DRAWINGS

For a better understanding of the invention and to show how the same may be carried into effect, reference will now be made, purely by way of example, to the accompanying drawings in which.

FIGS. 6A to 6C show operating states of the device of FIG. 1,

DESCRIPTION OF THE PREFERRED EMBODIMENTS

Figure 1:
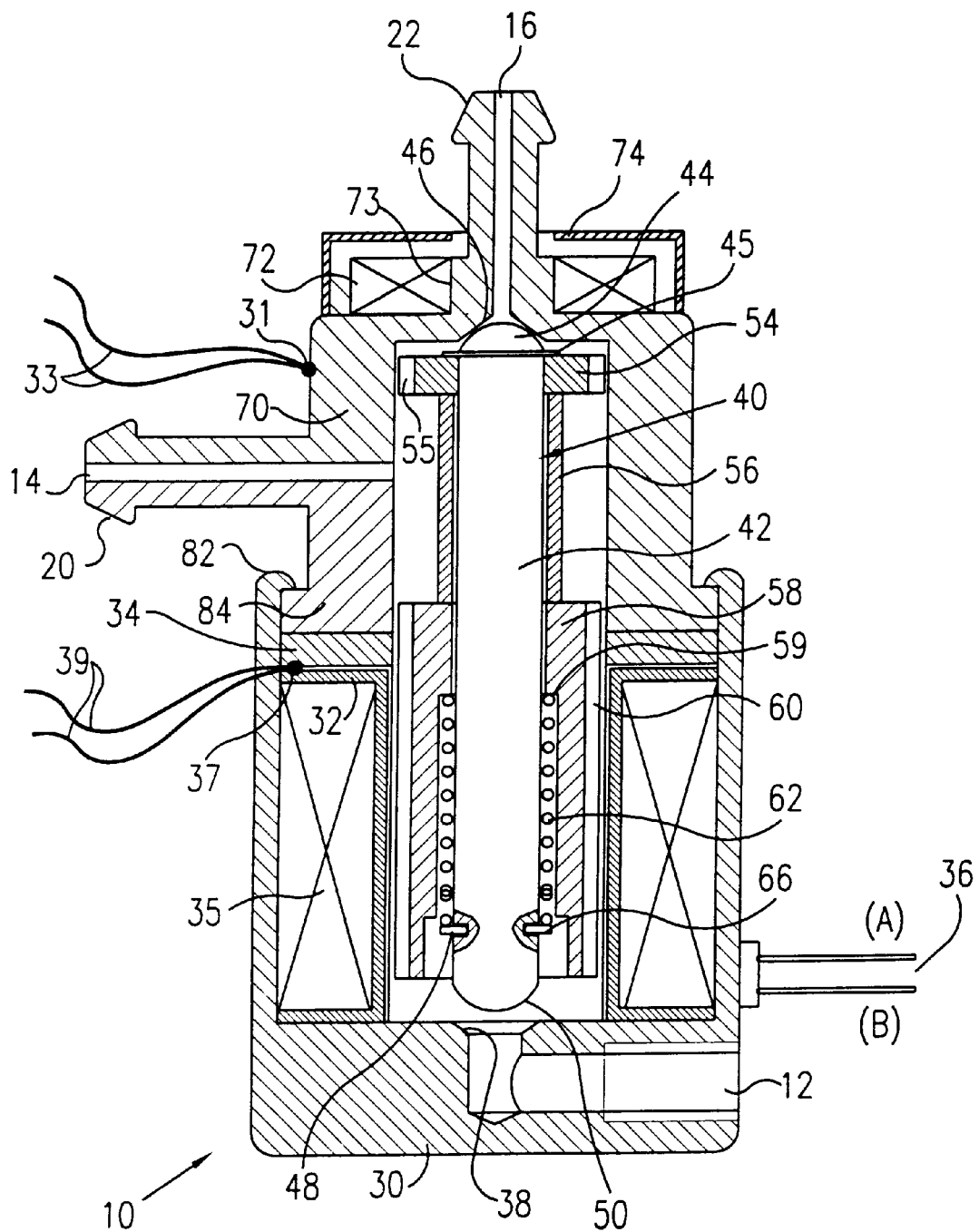
FIG. 1 shows a valve according to an embodiment of the present invention.

FIG. 1 shows a device according to an embodiment of the present invention. A solenoid valve 10 comprises a port 12 which is open when the valve is in the normal size. A further port 14 is perpetually open. A third port 16 is closed when the valve is in the normal state and opened when the coil is powered. Shoulders 20 and 22, are provided, to ports 14 and 16 respectively, over which rubber fittings and the like may be attached. Port 12 is internally threaded.

A lower housing 30 of ferrous material forms the base of the valve and provides part of a magnetic circuit that operates the valve.

A coil 35 is formed by the winding of wires around a bobbin 32, and may be connected, preferably to an external electricity supply, via connection 36. Connection 36 comprises two wires. A and B whose polarities may be switched as will be described below.

The coil 35 fits inside the housing and a covering piece 34, again of ferrous material, fits above the coil 35. The covering piece 34 is preferably in the form of an iron ring.

In a preferred embodiment temperature sensor 31 is provided to measure the ambient, and is attached to connection wires 33, and temperature sensor 37 is provided to measure the temperature of the coil 35. The sensor 37 is attached to connection wires 39. When associated with appropriate control equipment the outputs of the sensors 31 and 37 can be used to ensure that overheating is prevented by entering a predetermined safety procedure which ensures that the total time that the coil is at a maximum excitation (and thus heating) is limited as necessary.

A plunger sub-assembly 40 is formed as follows:

The plunger sub-assembly 40 preferably comprises a plunger 42, preferably of plastic or any other non-ferrous material, a first sealing dome 44 for sealing port 16, a shoulder 45, a second sealing dome 50 for sealing port 12, and a snap ring groove 48. The sealing domes 44 and 50 may be made as an integral part of the plunger or they may be separate integers, for example of rubber.

Iron ring 54 is added to the plunger 42 and drawn up until it rests against shoulder 45. Iron ring 54 comprises conduits for conducting fluid flow therethrough. Hollow cylindrical member 56 which is of ferrous material, is then drawn up behind the iron ring 54 until it rests snugly thereagainst. Behind this an iron core 58 is then drawn along the plunger in like manner until it reaches the hollow cylindrical member 56. Iron core 58 has a number of axial conduits 60, preferably four, for carrying fluid across the plunger. A helical spring 62 is then inserted into the iron core 58 and fitted in place by the insertion of a snapring 66 into the groove 48 in plunger 42, thereby forming the plunger sub-assembly 40. The spring 62 has the effect of generating an internal bias with the plunger that prevents the formation of airgaps between the different magnetic components, 54, 56 & 58 so that in practice they form a single magnetic unit.

Plunger sub-assembly 40 is inserted into assembles lower housing within the hollow cylindrical center of the coil 35, such that the sealing dome 50 faces port 12 and is able to contact seat 38.

An upper housing 70 is inserted into the lower housing 30, to fit snugly within the upper rim 82 of the lower housing. The upper rim 82 is then folded over shoulder 84 of the upper housing to form a single unit. A permanent magnet 72, which is in ring form, is fixed over the neck 73 of the upper housing 70, and a plastic protective cover 74 is placed over the magnet 72.

The skilled man will appreciate that it is possible to vary the above described embodiment without altering its function. For example the magnet 72 can be placed on the plunger 42 and the ferrous ring 54 can be placed on the upper housing 70. The explanations of magnetic behavior that follow relate directly to the embodiment shown in the Figures but the skilled man will appreciate that the same principles continue to apply.

Figure 2:
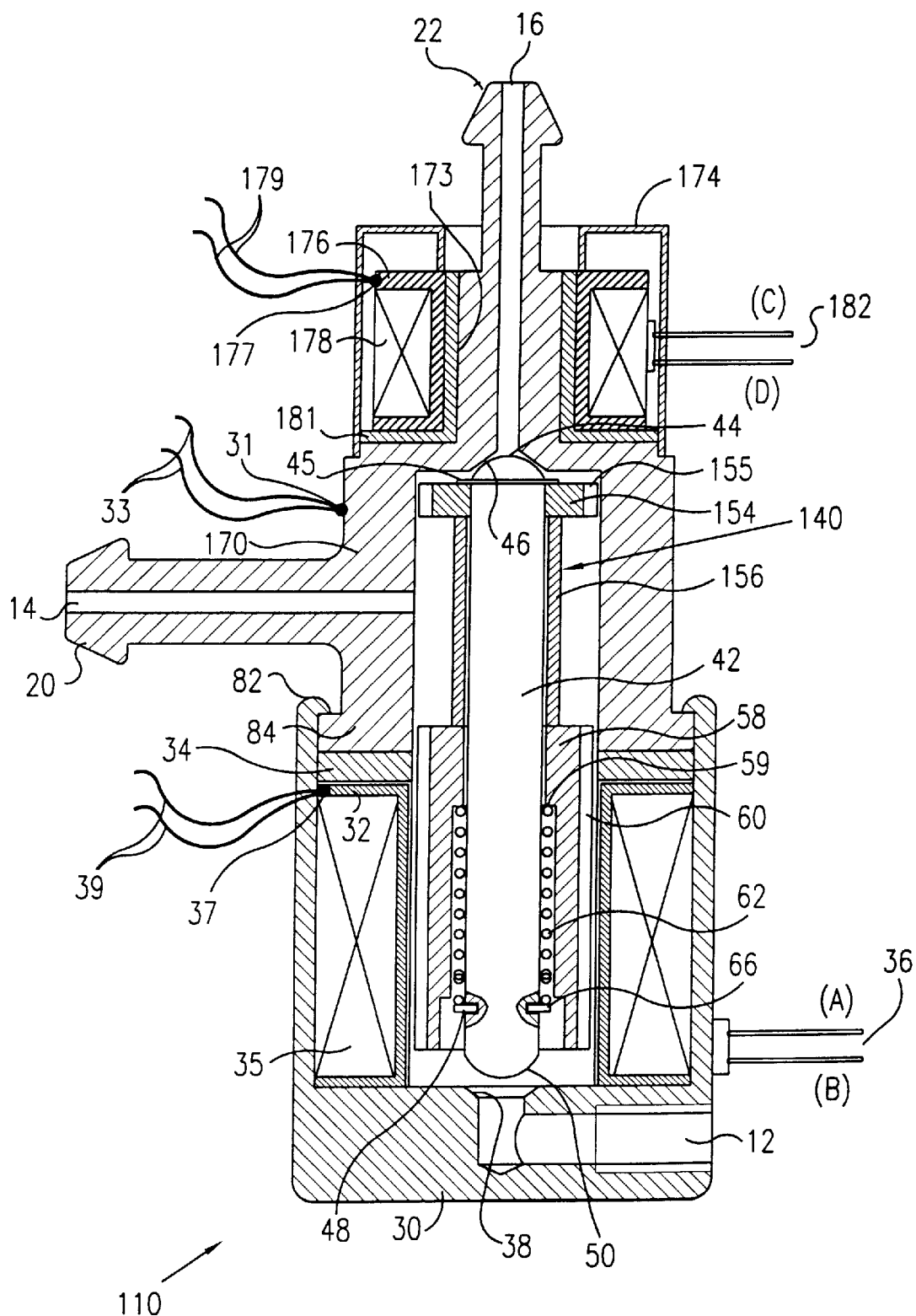
FIG. 2 shows a valve according to an alternative embodiment of the present invention.

FIG. 2 shows an alternative embodiment of the valve of the present invention. Parts which are identical to those in FIG. 1 are given the same numbers and are not described again. The lower housing sub-assembly is constructed in the same manner as that of FIG. 1 and the plunger subassembly 140 of valve 110 is also constructed in like manner except for the following:

Hollow cylindrical member 156 is made of plastic or other non-ferrous material, and a magnet 154, having conduits 155, is in place of ferrous ring 54.

Upper housing 170 is inserted as described above.

An upper coil 178 is formed by the winding of wires around a bobbin 176, and is fixed over ferrous core 181, the sub-assembly thus formed being placed over the neck 173 of the upper housing 170. The upper coil 181 may be connected, preferably to an external electricity supply, via connection 182. Connection 182 comprises two wires C and D whose polarities may be switched as will be described below, and a plastic protective cover 174 is placed over the upper coil 178.

Temperature sensor 177 is provided to measure the temperature of the coil 178. The sensor 177 is attached to connection wires 179. When associated with appropriate control equipment the outputs of the sensors 31, 37 & 177 can be used to ensure that overheating is prevented by entering a predetermined safety procedure which ensures that the total time that the coil is at maximum excitation (and thus heating) is limited as necessary. This overheating of one of the coils, if detected, may be counterbalanced by increasing the current of the other coil.

Referring now to the embodiment shown in FIG. 1, the valve has two states, powered and unpowered. FIG. 1 shows the valve in the unpowered state, in which no voltage is provided across the connection 36 to the coil. This state is one of the two stable states of the valve. The same position is also achieved during the transient state that exists when the coil 35, is initially powered up prior to moving, as will be described below. In the unpowered state the plunger 42 is generally attracted by its ferrous ring 54, to permanent magnet 72. The plunger 43 is thus distanced from the seat 38 of port 12 so as to provide a path for fluid flow from port 14 through conduits 60 in the iron core 58 to port 12. Ports 12 and 14 are thus open, forming a fluid passage therebetween. The force of the magnet is sufficient to ensure that a watertight seal is formed between seat 46 and dome 44, despite the pull of spring 62.

In the powered state the coil 35 acts on the ferrous material of the core 58 to push the core 58 downwards and thus close the gap in the magnetic circuit. Shoulder 59 of core 58 acts to compress the spring 62 so that it pushes downwards on the plunger 42 via snapring 66. Thus the plunger 42 is pulled away from the magnet 72 towards seat 38 on the lower port 12. A watertight seal is formed between the second sealing dome 50 and seat 38 of port 12, under the force exerted by the compression of the spring 62. The port 16 is consequently opened and a fluid path is formed between port 14 and port 16 via conduits 55 in moving iron ring 54.

During the closing of the lower seat 38 the plunger 42 (and dome 50) preferably reaches the seat before the core 58 touches the lower housing 30. Fluid is thus trapped in the volume and is forced out via the conduits 60. This provides a cushioning effect and improves the lifetime of the core 58.

The force of attraction that closes port 16, in the unpowered state, (as shown in FIG. 1) generally depends on the dimensions and magnetic strength of permanent magnet 72, the dimensions of the moving iron ring 54 and the distance therebetween.

The force of attraction that closes port 12 depends on the compression of spring 62 at that position. It will be apparent that the compression force must be smaller than the force with which iron core 58 is held to the floor of the housing if the spring 62 is to serve the purpose of sealing the port 12. If the force of the spring were stronger the core would be pulled away from the floor of the housing 30.

The spring reduces the damage to seat 38 and the dome 50 that comes into contact with it because spring 62 provides axial separation between the plunger assembly 42 and the core 58 which is pulled down with very high acceleration by the coil 35 and thus hits lower housing 30 with high force. This force is absorbed by the spring 62. The force with which the sealing dome 50 strikes the seat 38 is thus limited by the compression force of the spring. The spring is powerful enough to ensure that the required sealing force is provided.

The above explanation relates to the collision of the plunger 42 with seat 38. This is achieved using a single spring 62. Below will be explained how a second spring may be connected to provide the same impact reduction effect in the second direction on the upper seat 46.

Figure 5A:
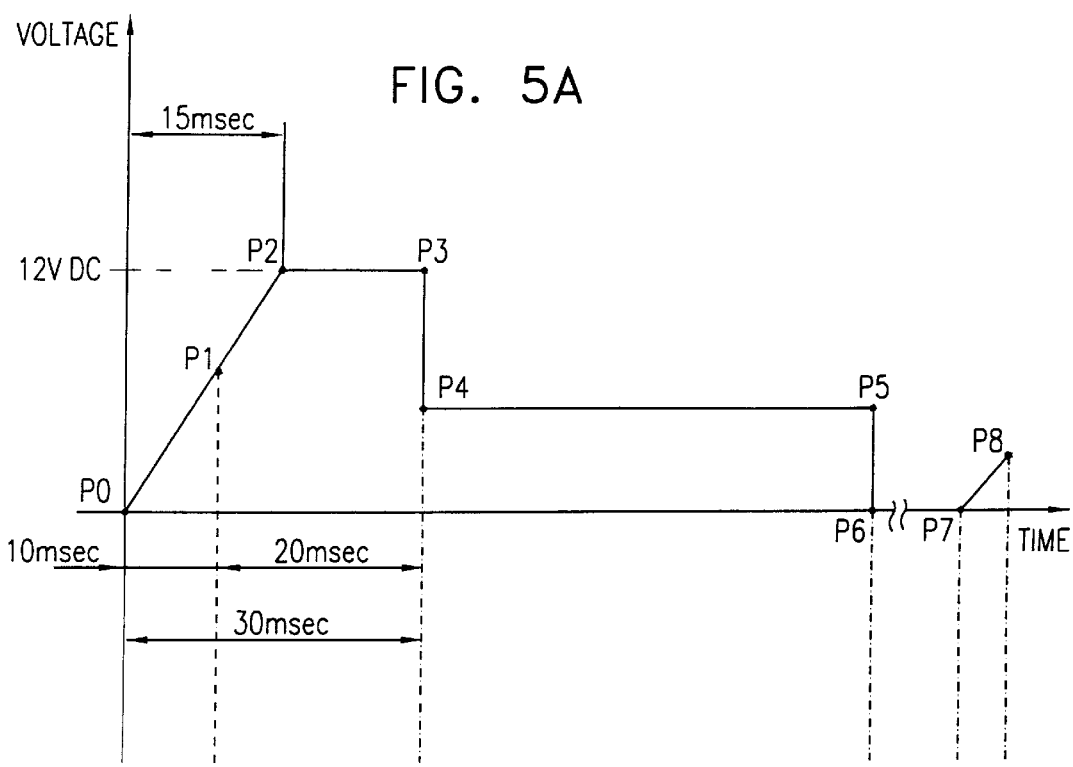
FIG. 5A shows a graph of applied voltage against time for a solenoid valve according to the present invention.

Moving to the operation of the embodiment of FIG. 2, the possibility of reducing the force of coil 35 on the core 58 is shown in FIG. 5A and in FIG. 16B, as explained hereinbelow.

In general the discussion presented here does not take explicit account of pressures that may be created by the fluids. This is solely for the purpose of simplifying the discussion.

Figure 9:
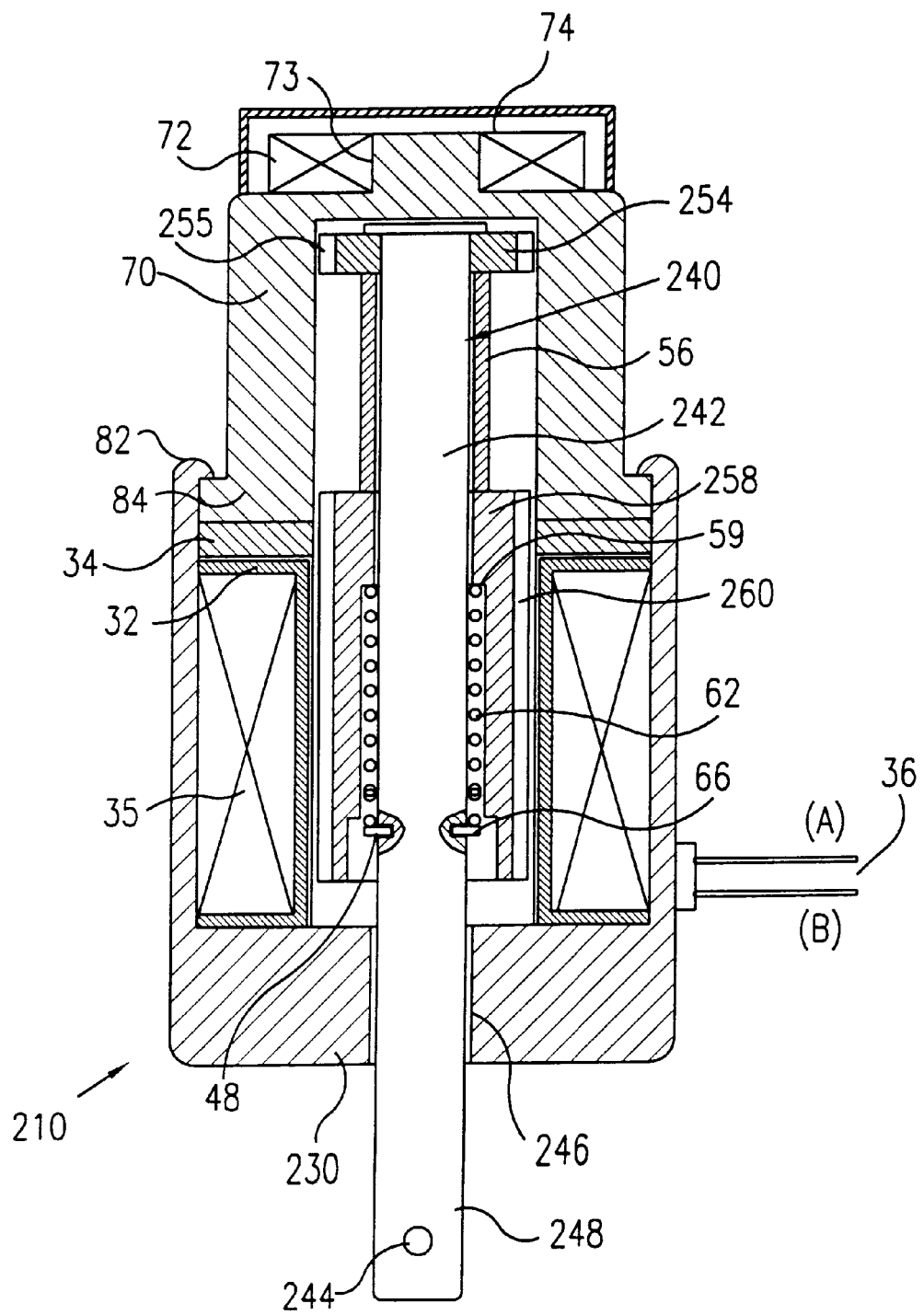
FIG. 9 shows a self-resetting shock absorption device utilizing the actuation mechanism of FIG. 1.
Figure 10:
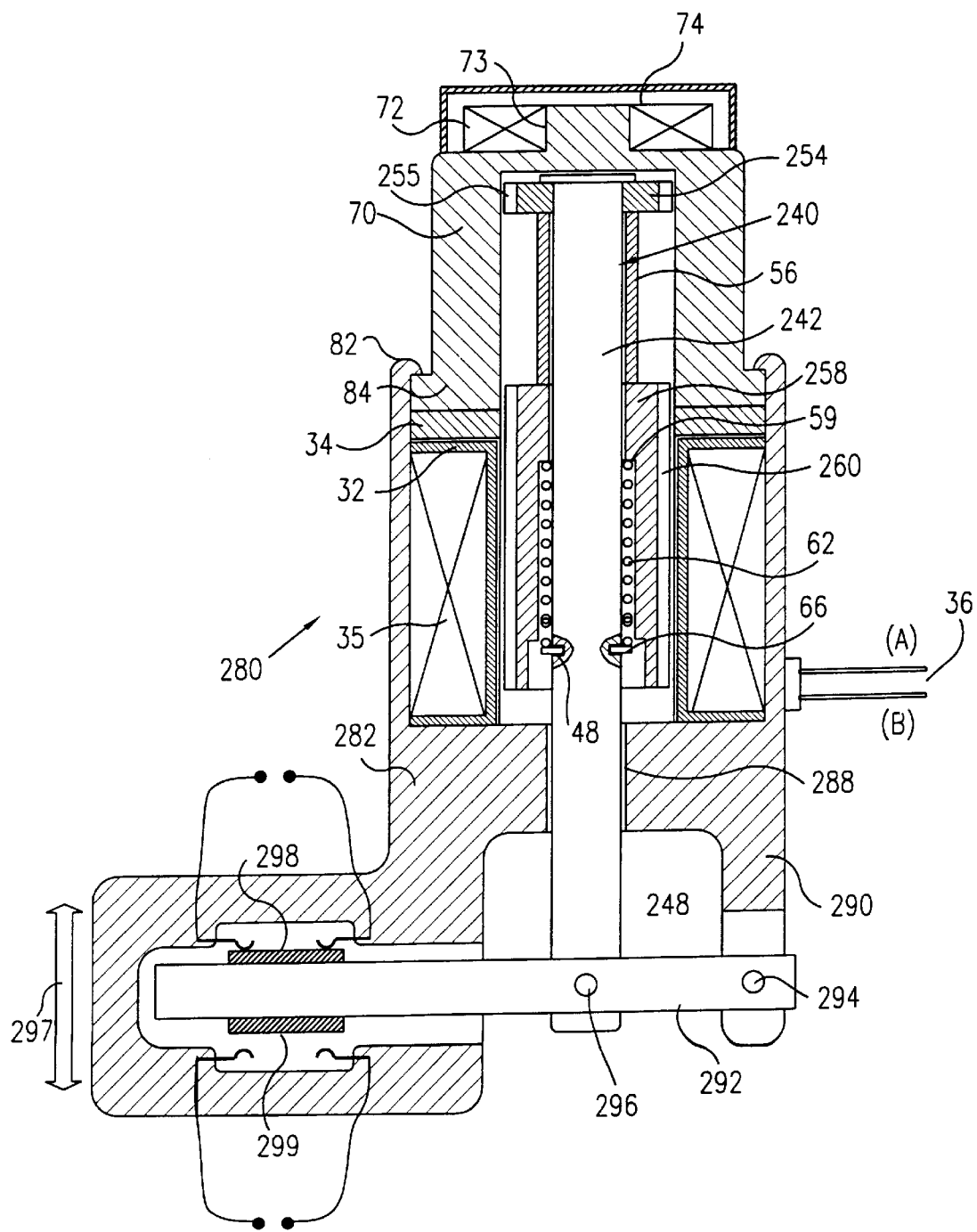
FIG. 10 shows a relay switch utilizing the actuation mechanism of FIG. 1.

FIG. 1 and 2, 6A–C, 11–13 and 19 show an actuator arrangement for a solenoid valve, which operates plunger 42. Other uses of the same actuator are shown in FIGS. 9 and 10 below.

Figure 3:
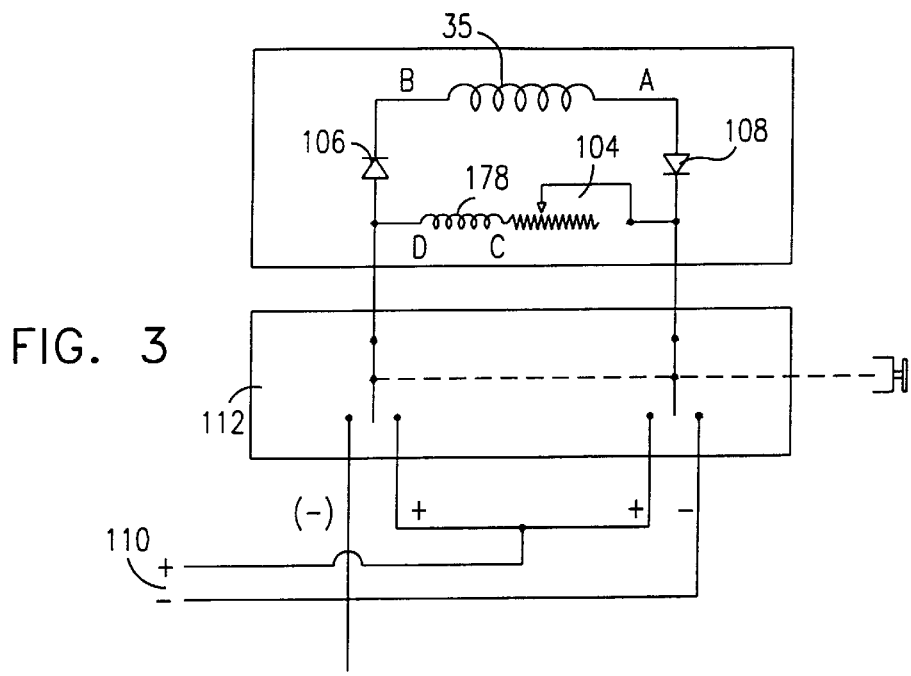
FIG. 3 shows a circuit diagram of a valve according to the present invention including electrical connections.
Figure 4A:
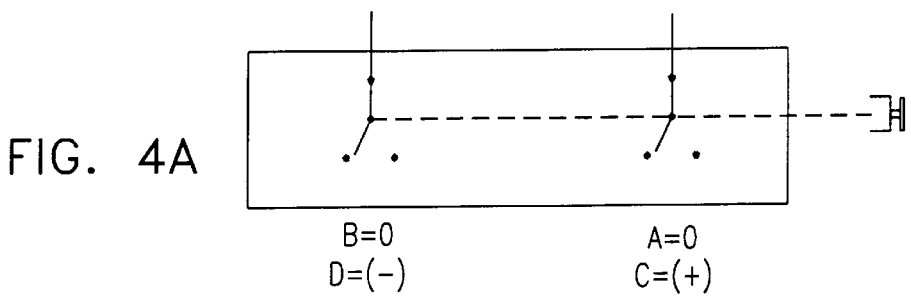
FIGS. 4A to 4C show different settings for a part of the circuit of FIG. 3.
Figure 4B:
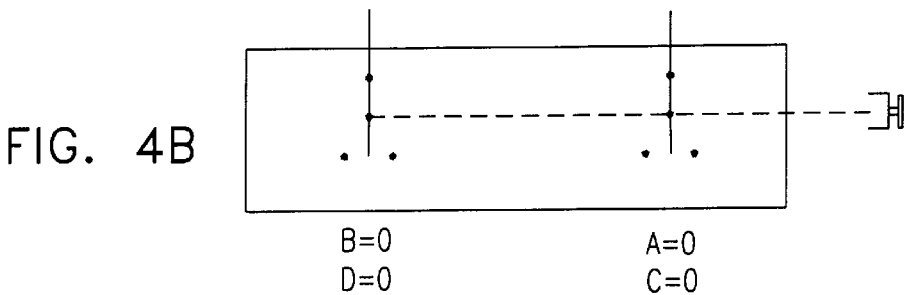
Figure 4C:
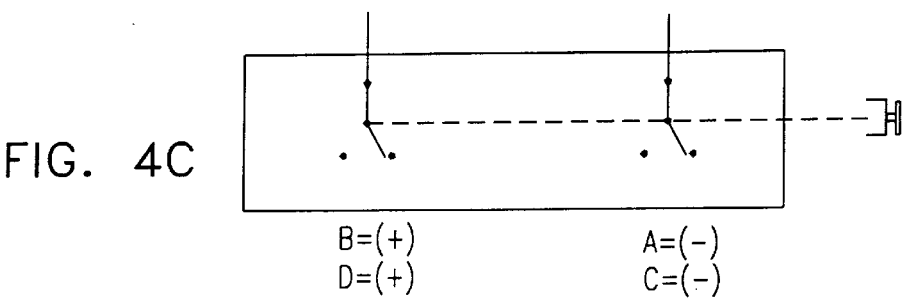

FIG. 3 shows how an electrical switching arrangement may be provided for the embodiment shown in FIG. 2. The main coil 35 is connected via two diodes 106 and 108 to a three-way switch 112. The upper coil 178 is connected, in parallel to the main coil 35, between the diodes and the three-way switch 112. FIGS. 4a–4c show the three states of the switch 112. In FIG. 4A the state of the switch in which the right hand connection is positive and the left hand connection is negative is shown. In this state the upper coil 178 is powered but the main coil 35 is not powered because of the action of the diodes. The valve would be set into the this state to hole the valve in the normal state. In this example the normal state is not unpowered as in the previous case and this gives the advantage that the valve can be used to withstand higher pressure differentials. In a preferred embodiment a rheostat 104 is provided which can be used to alter the voltage across the upper coil in order to resist different levels of pressure between port 16 and the internal pressure of the valve.

FIG. 4B shows the three-way switch 112 connected such that no voltage is supplied to either of the coils. This is the unpowered normal arrangement.

FIG. 4C shows the three-way switch 112 connected such that the left hand connection is positive and the right hand connection is negative. In this position, both the upper and main coils are powered, and the upper coil 178 is powered in the opposite direction with respect to FIG. 4A. A repulsion force is created between the upper coil and the magnet 154 to assist in pushing the plunger downward whilst the main coil 35 provides the principle force in pulling the plunger downward, thus achieving the energized state.

The effect of the upper coil 178 in the above state is as follows.

The operation of moving the core 58 downwards begins when the core 58 is at the uppermost extent of its travel. This means that at least some of the core 58 is not enclosed within the coil 35. The force produced by the coil 35 on the core 58 is proportional to the inverse of the square of the distance between them and thus at the very beginning of the motion the force of the coil is weakest. By contrast, in the conventional valve in which an upper magnet (or other latching arrangement such as a spring) continues to attract the plunger from above, the force of the upper magnet is maximum at this point. Thus the maximum force of the magnet etc. has to be overcome by the minimum force of the coil. In the present invention the direction of the force of the upper coil 178 is reversed so that repulsion takes effect at precisely this critical moment fan therefore the maximum force of the coil can be significantly reduced, and the efficiency of the solenoid valve 10 is increased. The same advantage applies to the reversal of the magnetic fields in the embodiment of FIG. 1.

As mentioned above, the power applied to the upper coil 178 may be varied by operation of rheostat 104. Thus the force of the upper coil 178 may be set to provide a small amount of repulsion that sets up an equilibrium between itself and the magnet 154, or the repulsion can be increased in order to push the magnet 154, and the attached plunger assembly 140, downwards.

The circuitry shown in FIG. 3 may be provided using an external manually operable switch, or as will be appreciated by the skilled man could also be implemented using microelectronics operated by a central processor or in any other suitable form. The location of the circuitry may be on the valve or it may be external to the valve as convenient.

FIG. 5A shows the voltage cycle applied to the coil 35 as the port 12 is closed and then opened. A ramp P0-P2 is first applied over a time period of typically 15 mS. Then a steady state voltage P2-P3 is applied over a further 15 mS. At some point, during the period P0-P2, which may vary depending on pressure and other variables, the port 12 is closed. In this graph the point of closure is P1. At point P3, when the steady state has been established, the voltage on the coil is reduced to the level denoted by the length P4-P5. At P5 the voltage is reduced to zero and the port 12 is opened. P7 and P8 show the beginning of the next cycle. This cycle is represented in table 1 by code 04.

Figure 5B:
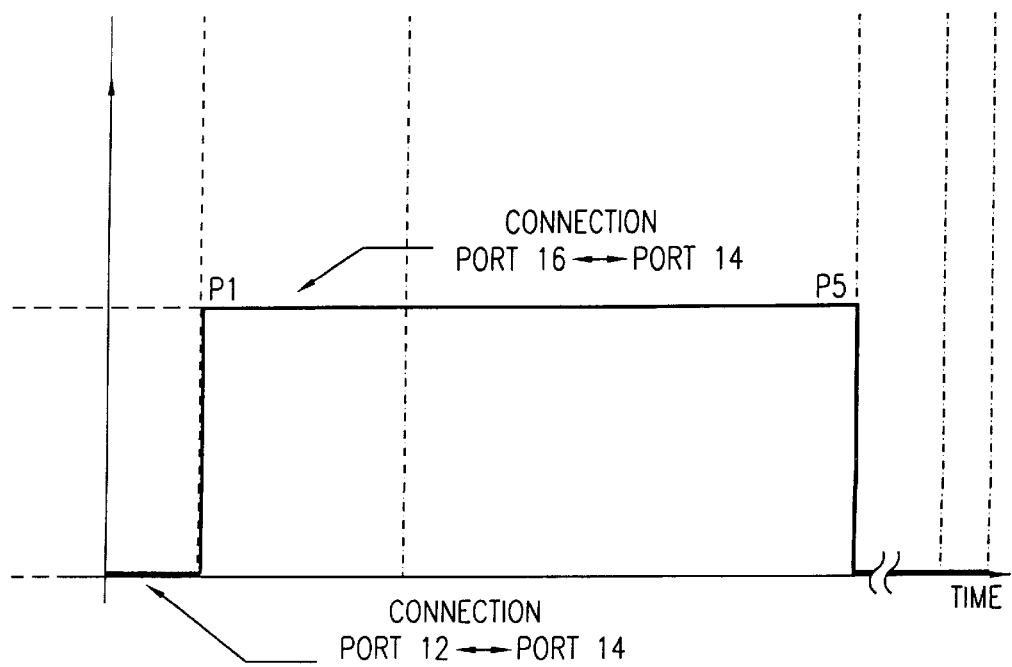
FIG. 5B shows the change in position of the plunger in response to the applied voltages of FIG. 5A.

FIG. 5B shows the states of the ports 12, 14, and 16, during the cycle shown in FIG. 5A.

Code 06 as defined in table 1 is the same as the above with reference to FIG. 5A and FIG. 5B with the additional use of the upper coil 178. The part of the curved represented by P0 to P3 is the same in both cases. However the portion from P4 to P6 can be achieved without current flow through the upper coil 178.

FIG. 6A shows the unpowered steady state of the valve, as discussed above in respect of FIG. 1. The coil 35 has no affect and the upper iron ring 54 produces a north pole in response to the south pole at the facing side of permanent magnet 72. The hollow cylindrical member 56 extends the magnetic field downwards to induce a weak south pole at lower face of core 58.

FIG. 6B shows the same valve in the state in which power is first introduced into the coil 35 whilst in the steady state. The connection 36 is connected such that wire A is the minus connection and wire B is the plus connection. The direction of the winding, and the strength of the current, are arranged such that a north pole appears at the lower end of the iron core 58 and hollow cylindrical member 56 extends the magnetic field such that a south pole which is formed at the upper end appears on the movable iron ring 54. The magnetic force produced by the coil causes the core 58 to begin the move downwards, as described above. The move downwards is assisted by the fact that the movable iron ring 54 now has an identical pole to that of the facing side of magnet 72. A repelling force is experienced therebetween, assisting the movement downwards of the plunger assembly 40. The size of the repulsive force is generally dependent upon the dimensions of the hollow cylindrical member 56 and its material, as it is the purpose of the said hollow cylindrical member 56 to transfer the magnetic field to the movable iron ring 54. The dimensions and material of the said hollow cylindrical member 56 must be optimized for this purpose and may require a certain amount of experimentation on the part of the skilled man. The use of the repulsive force is in contrast to all of the known prior art valves, in which the magnetic attraction is a force that has to be overcome in order to effect movement of the plunger.

FIG. 6C shows the plunger 42 is the position in which it is in contact with lower seat 38, thus closing port 12. The coil 35 receives voltage from input 36 such that a north pole is formed below and a south pole above. Core 58 is held to lower housing 30 and compresses the spring 62 to force the plunger 42 to contact lower seat 48, thus sealing port 12.

Figure 7A:
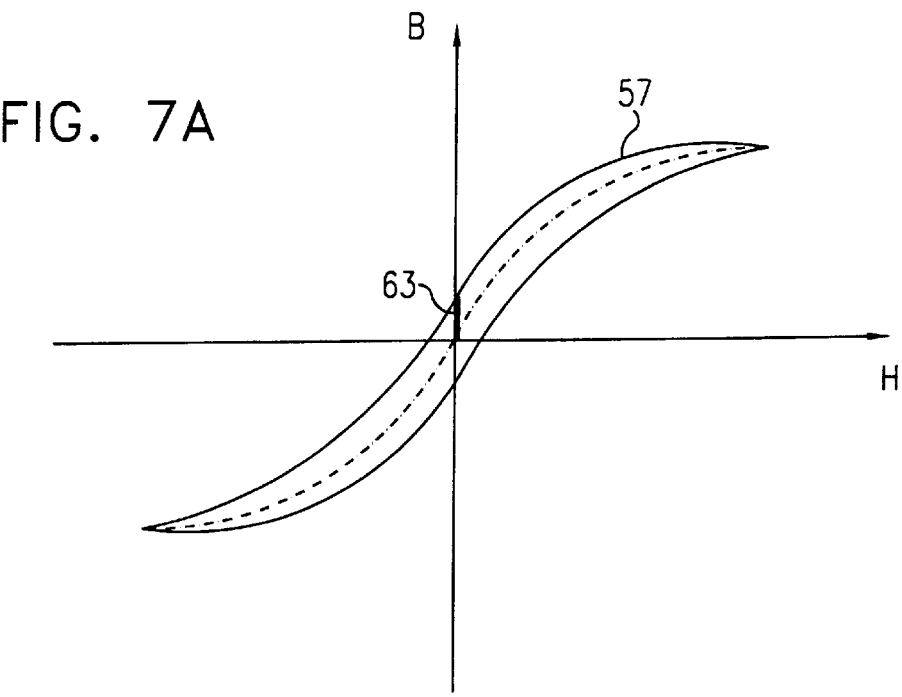
FIG. 7A shows a hysteresis curve for a ferrous material suitable for use with the present invention.
Figure 8A:
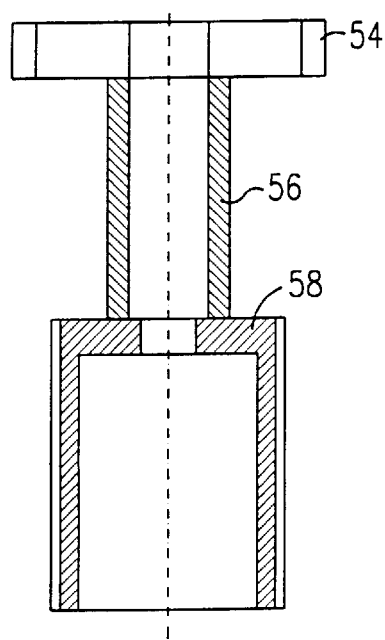
FIGS. 8A and 8B show details of the magnetic circuit of the device of FIG. 1.
Figure 8B:
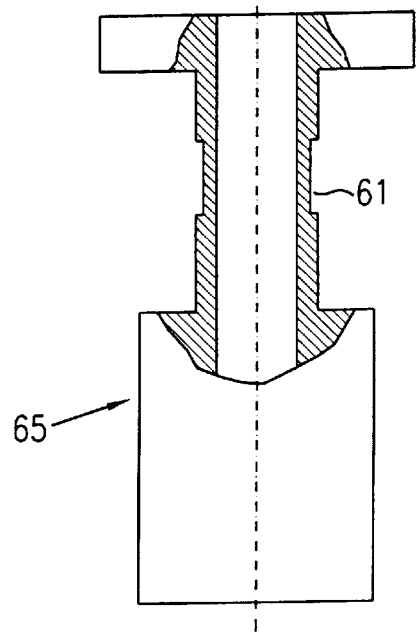

FIG. 7A shows a hysteresis curve for a ferrous material suitable for use with the present invention. They hysteresis curve 57 is a steep hysteresis curve which leaves a low residual magnetization 63 which can easily be overcome during operation and because this reduces the time delay involved in polarity reversal. In many applications of the invention rapid reaction of the valve will be important. The skilled person may find that different applications can be optimized by careful study FIGS. 8A and 8B show two embodiments of the hollow cylindrical member 56. In FIG. 8A the separate parts of the magnetic circuit, 54, 56 and 58, may, as represented above, for ease of manufacture and assembly, be made of separate parts and be assembled. Alternatively, as shown in FIG. 8B, they may be made of a single piece 65, which has the advantage that two airgaps are removed from the circuit. As will be appreciated it is also possible to make the circuit components in two parts as a compromise between ease of manufacture and effectiveness of the circuit. It may also be found advantageous to make the separate parts 54, 56, and 58 of material having different hysteresis curves.

Alternatively or additionally by changing the shape and/or dimensions of depression 61, in the wall of the hollow cylindrical member 56, it is possible to control the intensity of the magnetic field which passes from core 58 to iron ring 54. This change in shape and/or dimensions of depression 61 is applicable whether the member 56 is constructed as being a portion of iron ring 54 and core 58 (as shown in FIG. 8B) or a part of any of these elements.

It will be appreciated that the pull of the coil is weakest when the plunger is furthest extended from the coil, which is exactly the same position as where the pull of the magnet 72 is strongest. In order therefore to assist the coil, the ferrous ring 54 is connected via the hollow cylindrical member 56 to the magnetic source. It is possible (as will be explained below with respect to FIG. 3) to alter the polarity of the current into the coil so as to switch the pole of the ferrous ring 54. In this way the ferrous ring can be given the same polarity as the magnet 72 when it is desired to separate the two, and it can be given the opposite polarity when it is desired to pull the plunger back to the magnet 72. The magnetic strength of the ferrous ring 54 depends upon the thickness of ferrous material in the hollow cylindrical member 56 and this thickness can be optimized by the skilled man until the forces are found to be sufficiently balanced as to reduce the power requirements of the valve.

because the force of spring 62 aids the seal, and in this position the force of magnet 72 on the plunger is quite weak, (the force of magnet falls in proportion to the cube of the distance) the coil 35 does not have to produce a strong force to keep the plunger 42 against the lower seat 38. Strong force is required only to pull the plunger 42 away from the magnet 72. Further, in order to reduce the force required to part the plunger 42 from the magnet 62 the shoulder ring 46, which, it will be recalled, sits between dome 44 and ferrous ring 54, serves to prevent the ferrous ring from actually touching the magnet 72.

FIG. 9 shows an embodiment of a solenoid device 210 of the present invention in which parts which are similar to those mentioned earlier are given the same numbers and are not generally described again. Plunger subsequently 240 differs in that it contains a larger plunger which extends through lower housing 230 by way of opening 246. The extension of the plunger 242 outside of the housing is in the form of a rigid rod 248 having a hole 244 at its outer end. This arrangement allows the coil to transmit forces to external objects so as to provide pull and push. In FIG. 9 the arrangement is shown with moving iron ring 254 and conduits 255, and also iron core 258 with conduits 260. The removal of, or a change in the dimensions of, one or both of these sets of conduits 255 and 260 forces the transmission of force to be heavily damped by the fluid which can only with difficulty pass from chamber to chamber. Thus a shock absorbing effect is produced. It is also possible to extend the plunger 240 to protrude a greater distance from the core 258, thus increasing the size of the fluid chamber and in turn increasing the damping effect.

FIG. 10 shows a further embodiment of a solenoid device 280 of the present invention used as an electrical delay switch. The plunger assembly is as described with reference to FIG. 9. Extension 290 of lower housing 282 has a lever 292 pivotally attached thereto via pin 294 and is also pivotally connected to rod 248 via pin 296 so that plunger 242 is able to pivot the lever 292 between an upper position and a lower position, as indicated by arrow 297. In the upper position it is able to provide an electrical connection across a first relay contact 298 and in the lower position it provides an electrical connection across a second relay contact.

Figure 11:
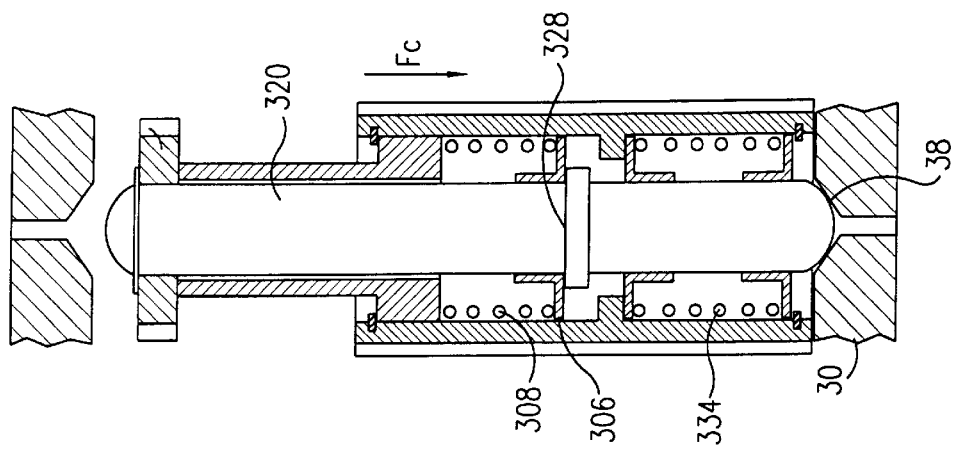
FIG. 11 shows a third embodiment of the present invention.

FIG. 11 shows a further embodiment 300 of the present invention in a position intermediate its two stable positions, in which inner parts are in equilibrium, for greater clarity of the following explanation. In FIG. 11 the device 300 comprises a coil 302 and conduits 304. Within the coil 302 is a centering ring 306, upper spring 308, hollow cylindrical member 310, snapring 312, and moving iron ring 314. A plunger assembly 320 comprises a plunger 322, shoulder 316 and an upper sealing dome 318. It further comprises a lower sealing dome 324. Intermediate the two ends of the plunger 322 is a cylindrical extension 326 which extends outwardly from the plunger 322 in a circumferential direction, the extension having an upper shoulder 328 and a lower shoulder 330.

Within the coil 302 are inserted the centering ring 332, a lower spring 334, a second centering ring 336 and a snapring 338.

In coil 302 is a small cylindrical part 340, which is part of the coil 302 and has an upper shoulder 342 and a lower shoulder 344. The axial length of the cylindrical part 340 is substantially the same as that of cylindrical extension 326. The upper spring 308 presses against sliding ring 306 which in turn presses on the upper shoulder 328 and under upper shoulder of 302. On the other side spring 334 presses against the sliding rings 332 which in turn presses against one of the shoulders 330 and 344 or against both. In this position it depends on the axial lengths of the cylindrical parts 340 and 326, and thus they fix the relative axial position of plunger 322 in the coil 302 such that the extension 326 and 340 are level (contrary to the positions of extensions 326 and 340 in FIGS. 12 and 13). Within coil 302 is a cylindrical hollow 348 within which outer wall 346 of core 310 is slidingly fitted to achieve mutual axial movement. The reason for this is that the flux passes across from the core 310 to the hollow cylindrical member 348 no matter what the position of the plunger 320.

Figure 12:
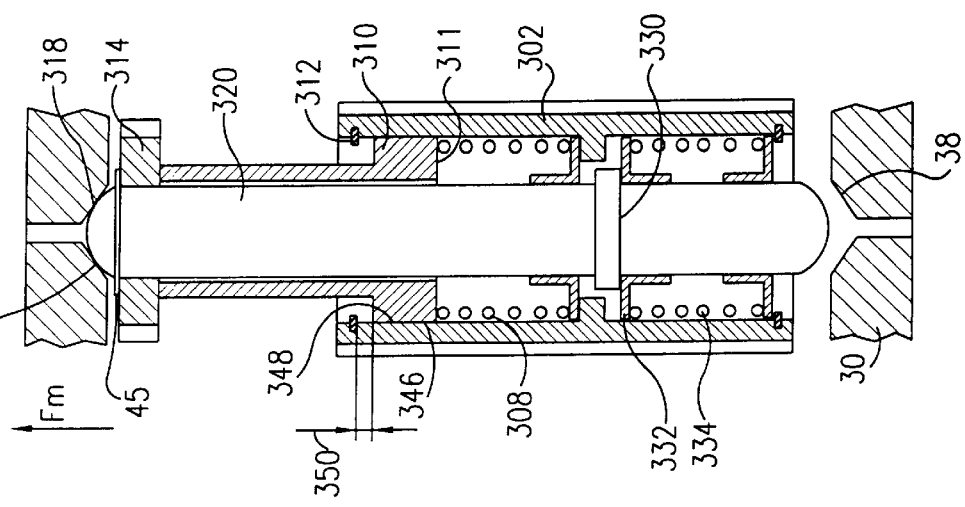
FIGS. 12 and 13 show operating states of the embodiment of FIG. 11.

FIG. 12 shows the device of FIG. 11 in the normal position. Details which are the same as those in previous figures are not described again. At the time of closing of port 16 a force $F_m$ is applied to plunger 320 by magnet 72 which draws ring 314. Furthermore, in the previous state, in which port 12 was closed, spring 334 was under compression, and its release provides additional upward force. Once plunger 320 has reached seat 46 and has been stopped core 302 continues over a distance indicated by arrow 350 until it is stopped by compression of springs 334 and 308. The force of the impact of the plunger 320 on seat 46 is thus considerably reduced. In more detail the Spring 334 has force applied directly from shoulder 330 which is part of plunger 320. In addition spring 308 is pressed on by shoulder 311 which is a part of the hollow cylindrical member 310. This in turn is pressed on by iron ring 314 which is pressed on by shoulder 45 which is part of the plunger 320 which thus presses against seat 46. Thus both springs 308 and 334 cushion the deceleration of plunger 320. Axial slipping over distance 350 between core 302 and hollow cylindrical member 310 is shown, and this distance provides the arrangement with flexibility, without substantially affecting the magnetic coupling.

Figure 13:
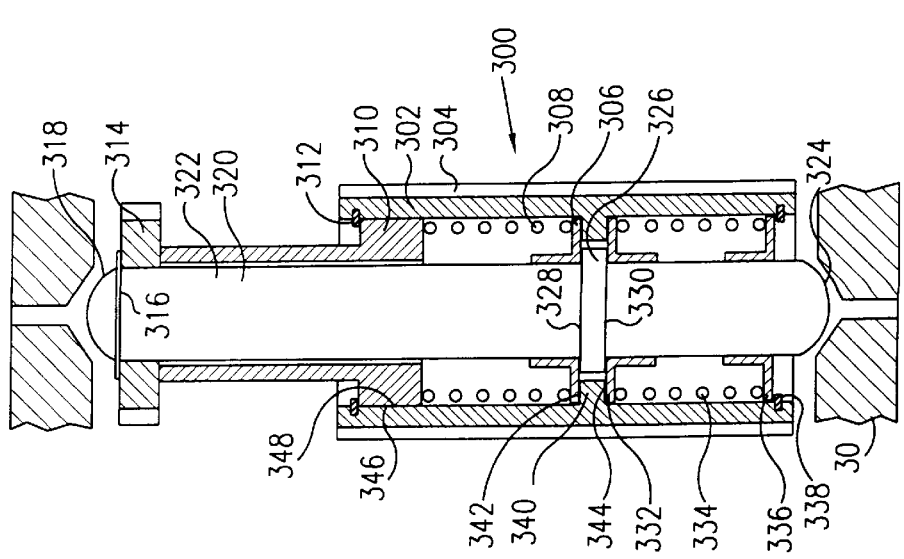

FIG. 13 shows the device of FIG. 11 in the steady state position in which port 12 is closed. Details which are the same as those in previous figures are not described again. The core 310 is pressed downwards by force $F_c$. This causes spring 308 to compress and push shoulder 328 downwards, and thus the plunger 320 comes into sealing contact with seat 38, thus closing port 12. Thus in this direction only a single spring 308 has effect, as a smaller force suffices.

The double spring arrangement described above thus provides two forms of impact cushioning. In one form, that of FIG. 12 the plunger is stopped suddenly and the springs are operative to absorb the kinetic energy of the core 302 until it stops. In the second form, that of FIG. 13, the core is stopped suddenly against the lower housing 30 and the descent of the plunger 320, is then caused by spring 308. The reduction in impact is simply due to the fact that the core 302 is no longer in motion.

It will be appreciated that in the embodiment shown in FIG. 2 the upward forces on the plunger 140 are generally stronger than in the embodiment of FIG. 1. The double spring arrangement and the cushioning of the upward motion is thus especially helpful with this embodiment.

Figure 14:
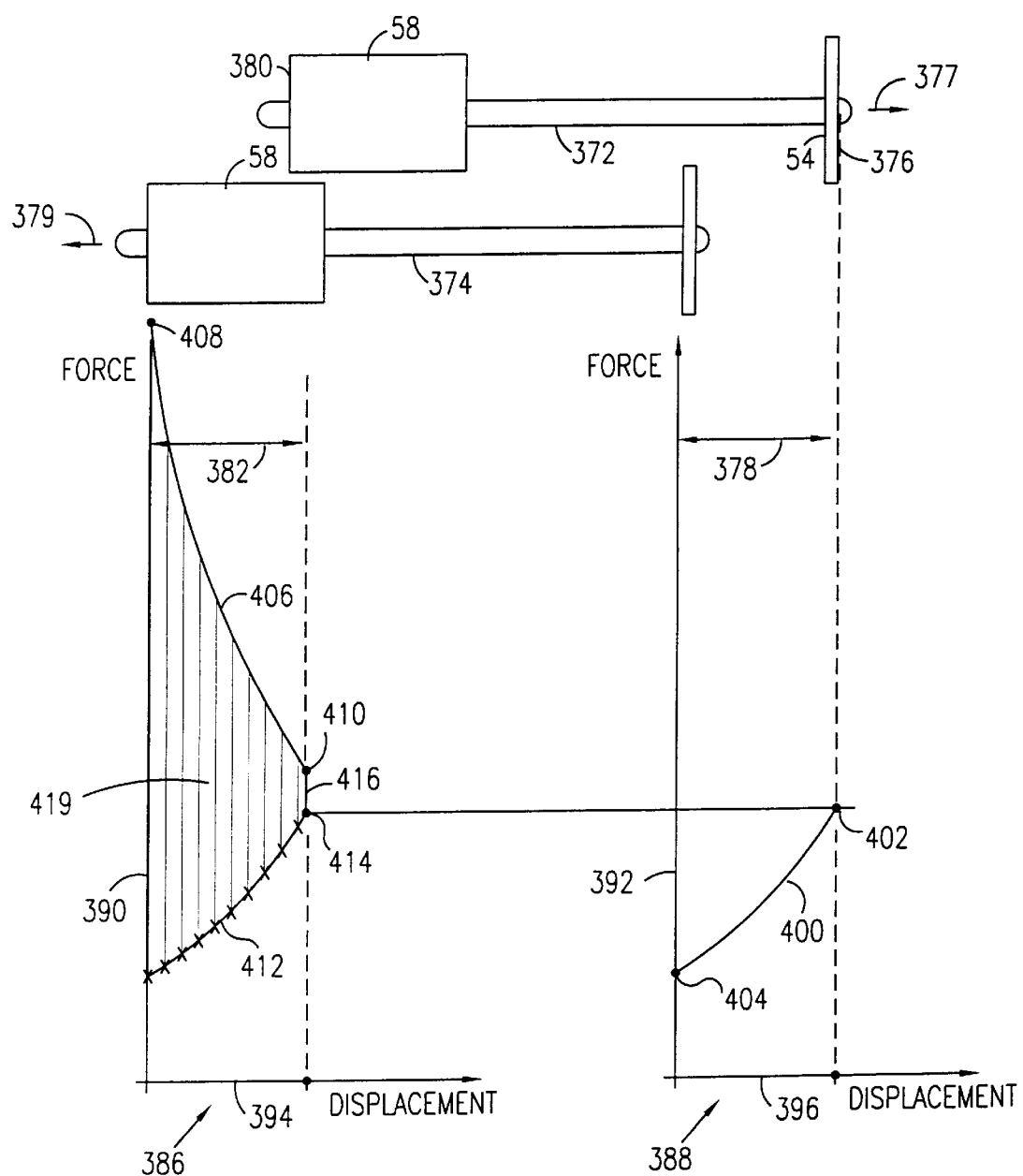
FIG. 14 shows a force-displacement characteristic of a device according to the present invention.

FIG. 14 is a graphical representation of the magnetic forces of a device in which the hollow cylindrical member 56 is not of ferrous material. Otherwise the device is similar to that shown in FIG. 1. This graph is given for reference purposes. For easy reference throughout the graphs a schematic outline of the plunger assembly 40 in its two stable positions is shown. The upper outline 372 is in the normal position and the lower outline 374 in the powered position. It will be appreciated that here in these graphs, as in the rest of this description, external pressures or forces, as well as friction, which are generally considerably smaller than the magnetic forces described, are ignored for the sake of simplicity.

The displacement 378 of the iron ring 54 between the two situations, as shown by arrow 377 and closing port 16, and the displacement 382 of the iron core 58 between the two positions, as shown by arrow 379 and closing port 12, and the displacement 382 of the iron core 58 between the two positions are generally equal in size, and negligible differences due to the compression of the spring 62 will be ignored for the purposes of the following discussion. Outer shoulders 376 of the iron ring (that is to say the shoulders directly facing the magnet 72) are used in the graphs to define the displacement 378 of the iron ring. The outer shoulder 380 of the iron core 58, ( that is to say the shoulder facing the lower housing 30) is used in the graphs to define the displacement 382 of the iron core 58.

Graph 386 is the graph of magnetic force as a function of displacement at the core side of the plunger, and graph 388 is the graph of magnetic force as a function of displacement at the magnet side of the plunger. Vertical axes 390 and 392 show force and the horizontal axes 394 and 396 are displacement axes.

Graph 400 shows the characteristic of the attraction between the permanent magnet 72 and the ring 54 when no substantial external magnetic field is applied to the ring 54 (for example when hollow cylindrical member 56 is of non-ferrous material).

The right hand extremity 402 of graph 400 is the maximum force of the arrangement, when the iron ring 54 is closest to the magnet 72, and the left hand extremely 404 of the graph 400 is the minimum force when the iron ring 54 is furthest away.

Graph 406 shows the characteristic of the force between the iron core 58 and the coil 35. The upper left hand point 408 of the graph 406 describes the pull in the downward direction of the coil 35 when the core 58 is at the lowest point of its travel. Intermediate right hand point 410 describes the same force when the coil is at the uppermost point of its travel. A right hand point 410 describes the force when the core is at the uppermost point of its travel.

The force represented by graph 400 acts in opposition to the force of coil 35. This may be represented by drawing graph 400 on the same axis as graph 406, to give new graph 412. The shaded area 419 in between the two graphs 406 and 412 represents the resultant force on the plunger 40 as a function of the displacement. It will be noted that the characteristic 406 is raised somewhat above the characteristic 412 and this gives a reserve of force that powers the initial separation of the plunger assembly 40 from seat 46 when the coil 35 is energized. This reserve is marked 416.

Figure 15:
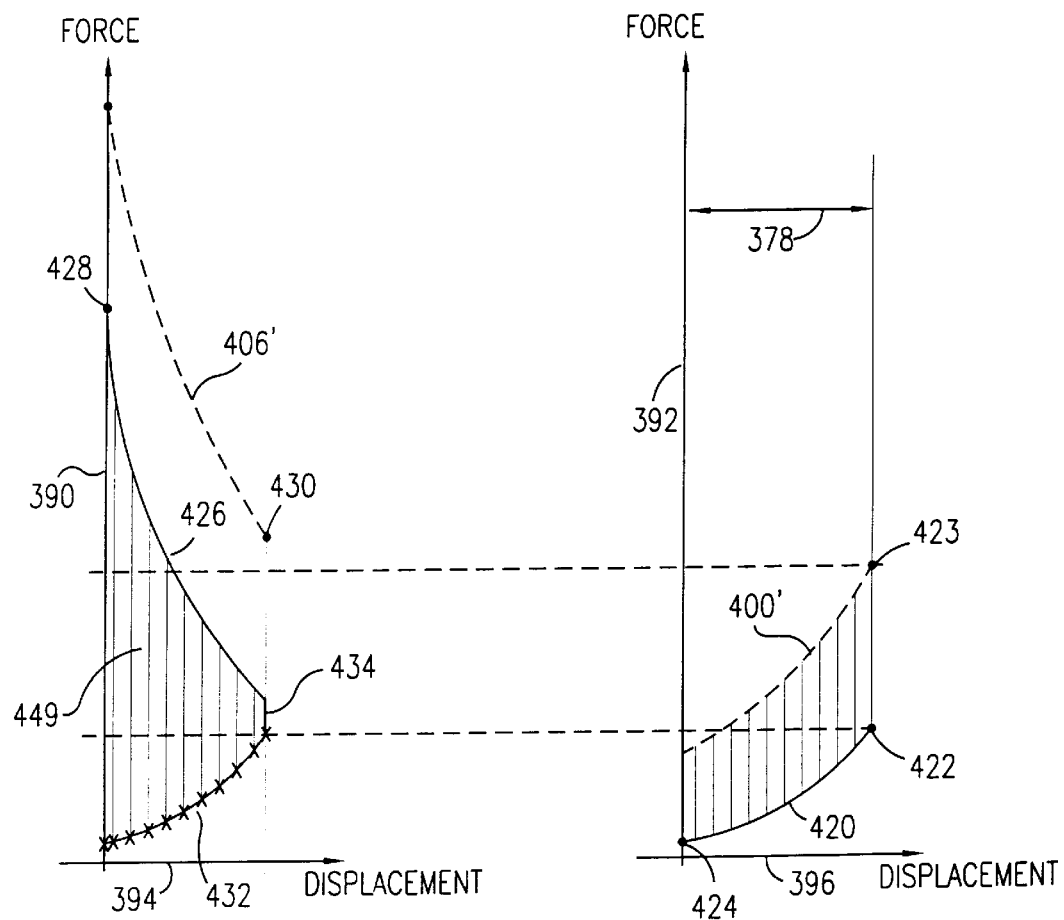
FIGS. 15, 16A, 16B and 16C show force displacement curves for embodiments of the present invention.

FIG. 15 relates to the situations shown in FIG. 6A, FIG. 6B and FIG. 6C. FIG. 15 is a graph showing how the situation in FIG. 14 is modified if the hollow cylindrical member 56 is made of ferrous material and is arranged, upon energizing of the coil 35, to pass to the iron ring 54 a pole which is the same as the facing pole of the magnet 72. Graph 420 shows the characteristic of the attraction between the permanent magnet 154 and the upper coil 178.

The right hand extremity 422 of graph 420 is the maximum force of the arrangement, when the magnet 154 is closest to the upper coil 178, and the left hand extremity 424 of the graph 420 is the minimum force when the magnet 154 is furthest away.

Graph 426 shows the characteristic of the force between the iron core 58 and the coil 35. The upper left hand point 428 of the graph 426 describes the pull in the downward direction of the coil 35 when the core 58 is at the lowest point of its travel. Intermediate right hand point 430 describes the same fore when the core is at the uppermost point of its travel.

The force represented by graph 420 acts in opposition to the force of the coil. This may be represented by drawing graph 420 on the same axis as graph 426, to give new graph 432. The shaded area 449 in between the two graphs 426 and 432 represents the resultant force on the plunger 40 as a function of the displacement. It will be noted that the characteristic 426 is raised somewhat from the characteristic 432 and this gives a reserve of force that powers the initial separation of the plunger assembly 40 from seat 46 when the coil 35 is energized. This reserve is marked 434.

The rightmost position of graph 400' shows approximately the situation in FIG. 6A in which no voltage is applied to the coil 35. From point 423 at the topmost right-hand corner of graph 400' to the axis represents the force that latches the plunger in unpowered position. The vertical distance between upper graph 426 and lower graph 432 represents the force acting on the plunger 42 at may given displacement. The rightmost of these two graphs represents the position in FIG. 6B. The leftmost part of the graphs represents the situation shown in FIG. 6C.

Graphs 400' and 406' are the same as the graphs 400 and 406 shown in FIG. 14 and are shown for ease of reference.

Figure 16:
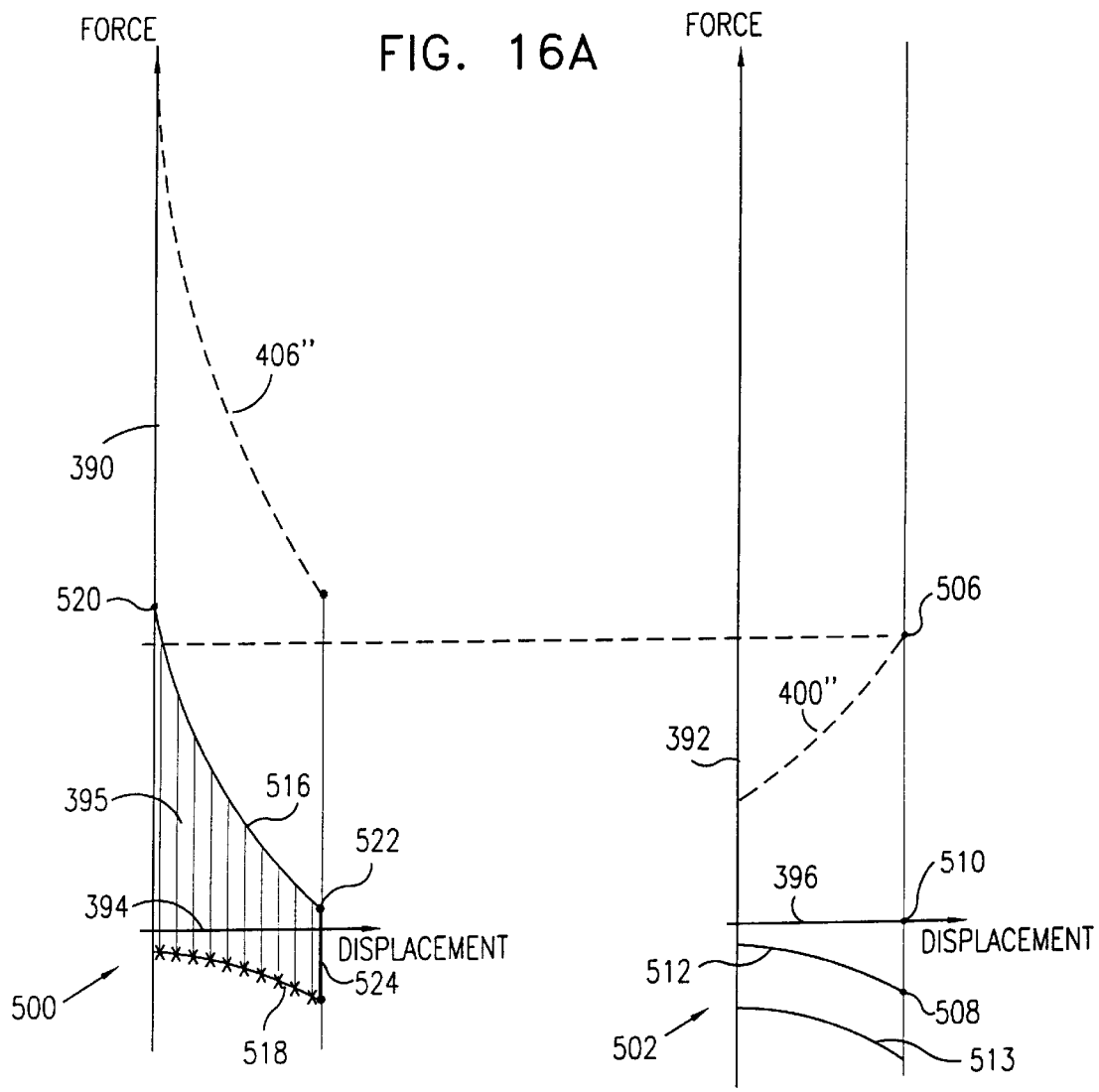

FIG. 16A refers to the embodiment of FIG. 2. FIG. 16A is a graph showing how the situation in FIG. 15 is modified if the hollow cylindrical member 156 is made of non-ferrous material and in which a permanent magnet 154 is mounted on the plunger assembly 140. Situations for this embodiment similar to those in FIGS. 6A to 6C shown in FIG. 15, are represented by corresponding parts of the graphs in FIG. 16. Powering of the coil whilst in the unpowered position moves the graph from position 506, the top right hand corner to position 508, the bottom right hand corner which in practice means that a large attractive force is converted into a repulsive force. As the core 58 approaches the lower housing 30, the path of graph 512 is followed leftwards, using a particularly low level of current, and graph 516 shows the increasing power of the coil 35 to pull the core 58 towards the lower housing 30. If a higher level or current were to be applied then this would give a greater pushing force in the direction of port 12 as shown in curve 513.

Graph 512 shows the characteristic of the attraction between the permanent magnet 154 and the upper coil 178.

Graph 516 shows the characteristic of the force between the iron core 58 and the coil 35. The upper left hand point 520 of the graph 516 describes the pull in the downward direction of the coil 35 when the core 58 is at the lowest point of its travel. Intermediate right hand point 522 describes the same force when the core 58 is at the uppermost point of its travel.

The force represented by graph 512 acts together with the force of the coild 35. The shaded area 395 in between the two graphs 516 and 518 represents the resultant force on the plunger 42 as a function of the displacement. It will be noted that the characteristic 516 is raised somewhat from the characteristic 518 and this gives a reserve of force 524 that powers the initial separation of the plunger assembly 140 from seat 46 when the coil 35 is energized. It can be seen that the coil 35 need have hardly any influence at the extreme right hand position of the graph, or indeed no influence at all, and thus the coil 35 may be far smaller than in prior art designs.

Graphs 400" and 406" are the same as graphs 400 and 406 shown in FIG. 14 and are shown for ease of reference.

FIG. 16B shows the situation in FIG. 16A when the plunger is at its lowermost position, and the current in the upper coil 178 is reduced to zero. Graph 530 shows the force of the coil 35 on core 58 and line 532 represents the required force to overcome the pressure at port 12. This gives a reserve indicated by the vertical distance between line 532 and uppermost left hand point 536 which enables a reduction in the current in the coil 35 once the steady state has been reached. This is the reduction between P3 and P4 shown in FIG. 5A. The reduction in force is typically to a point 542, giving a reduced reserve. It will be appreciated that some reserve should always be maintained, for example to deal with sudden pressure fluctuations.

FIG. 16C shows the force displacement curve 544 for core 178 which pulls magnet 154 and the attached plunger 140. This force can be large with respect to graph 400" and depends on the current provided at input 182, which is now of reserved polarity to that described with respect to FIG. 16A.

Figure 17:
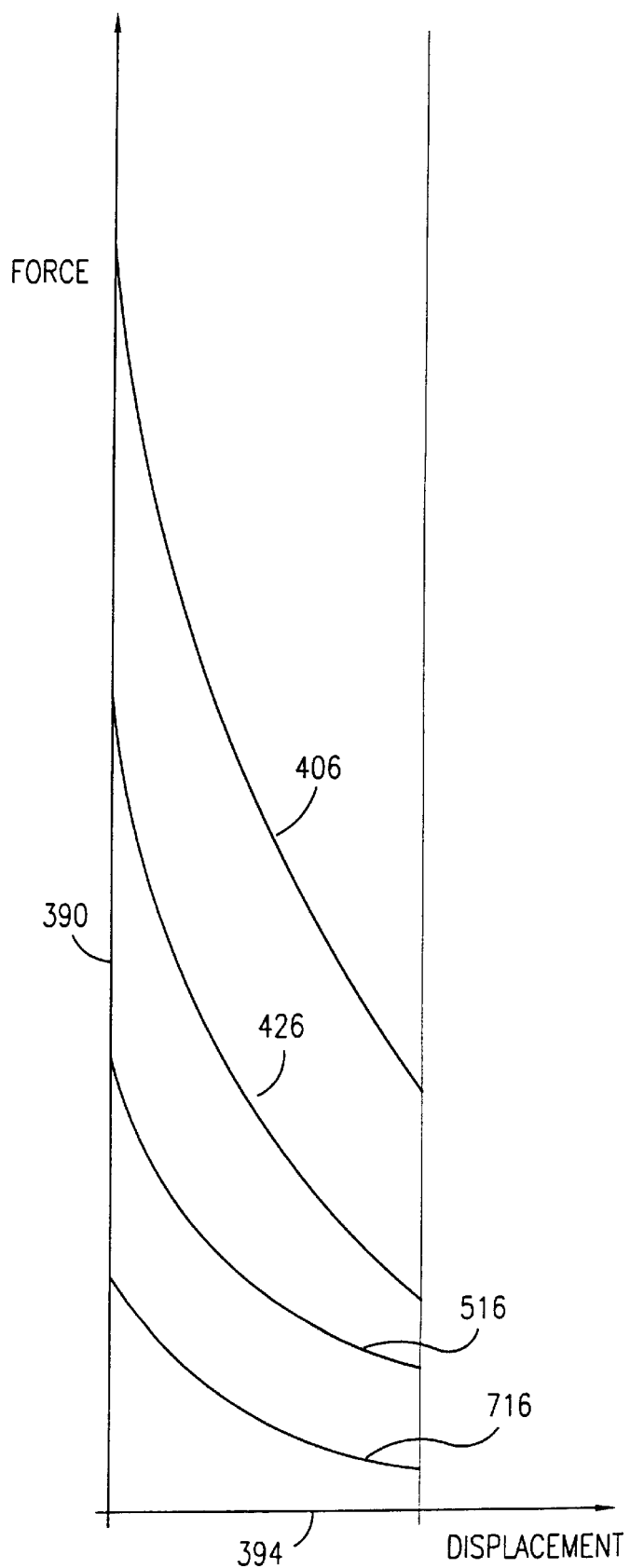
FIG. 17 shows the force displacement curves of FIGS. 14 to 16 on a single graph for comparison purposes.

FIG. 17 shows, on a single pair axes, the four characteristics 406, 426, 516 and 716 respectively, of the coils of FIGS. 14, 15, 16, and 20. It will be seen that, in each successive embodiment the strength needed by the coil 35 is reduced. In practice this means that it is possible to make the coil, and therefore the arrangement as a whole, smaller. Graph 716 will be discussed in more detail below in connection with FIG. 20.

Figure 18A:
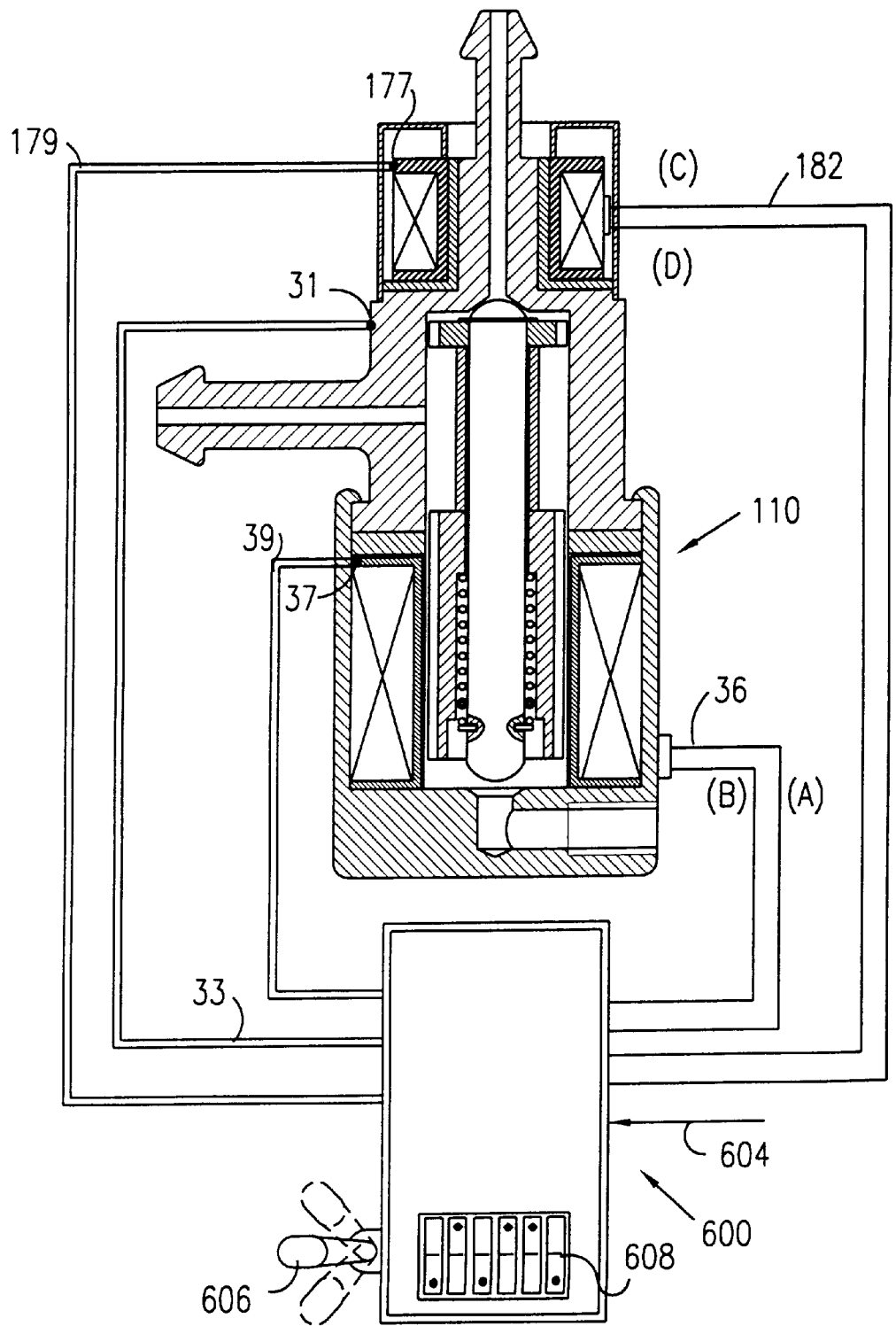
FIGS. 18A and 18B show a valve according to FIG. 1, with integral and external microcontrollers respectively.

FIG. 18A shows a preferred embodiment of the invention in which a microcontroller, 600, for example a PLC, or like device, is used to control the electrical inputs 36 and 182 to a solenoid valve 110. Inputs are provided for the temperature sensors 31. 37, and 177. Commands to the microcontroller are received at input 604 and may come from a computer or like device and the input may be serial or parallel. Preferably there may also be provided a hand-operated switch 606 and or a bank of dip switches 608.

Figure 18B:
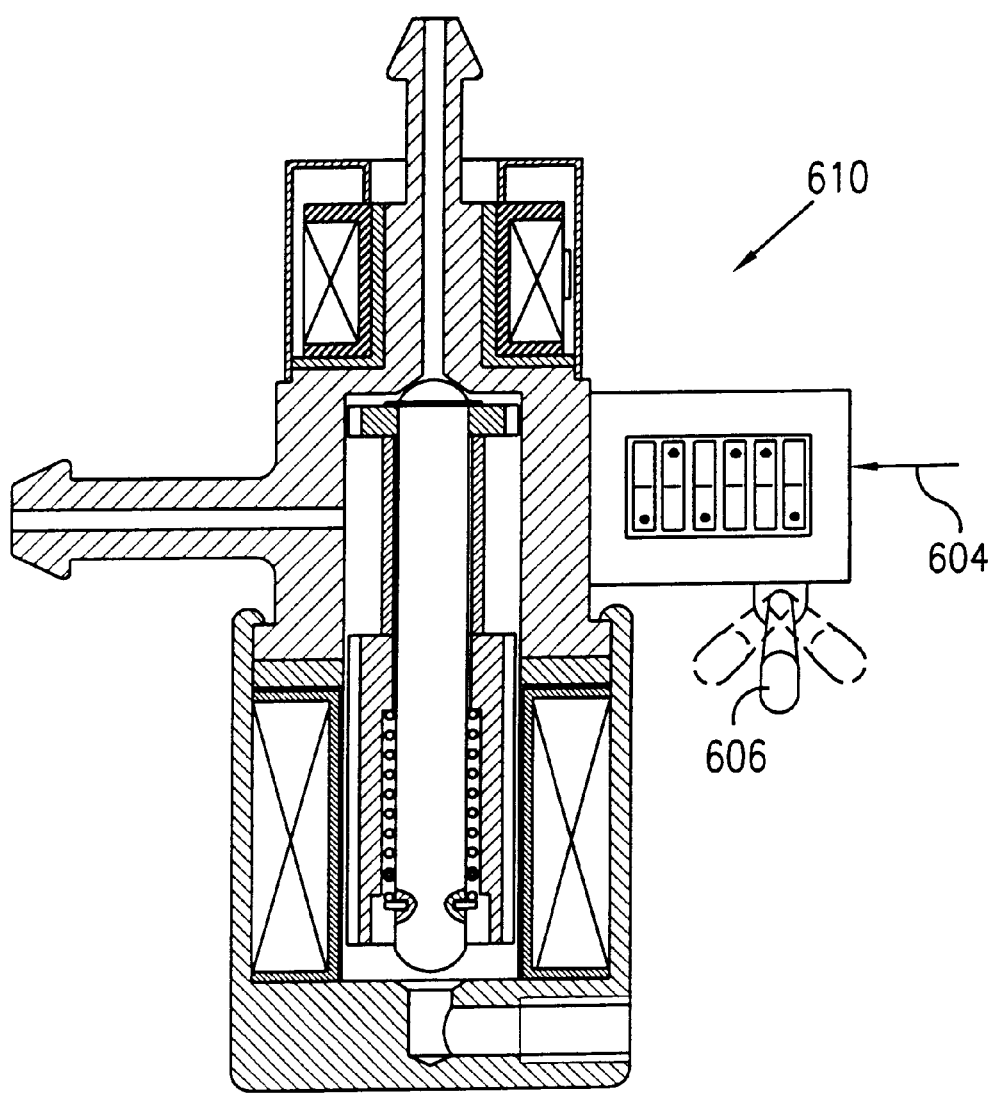

FIG. 18b shows the same arrangement provided in integral fashion within the valve to form control valve 610 integrally.

Figure 19:
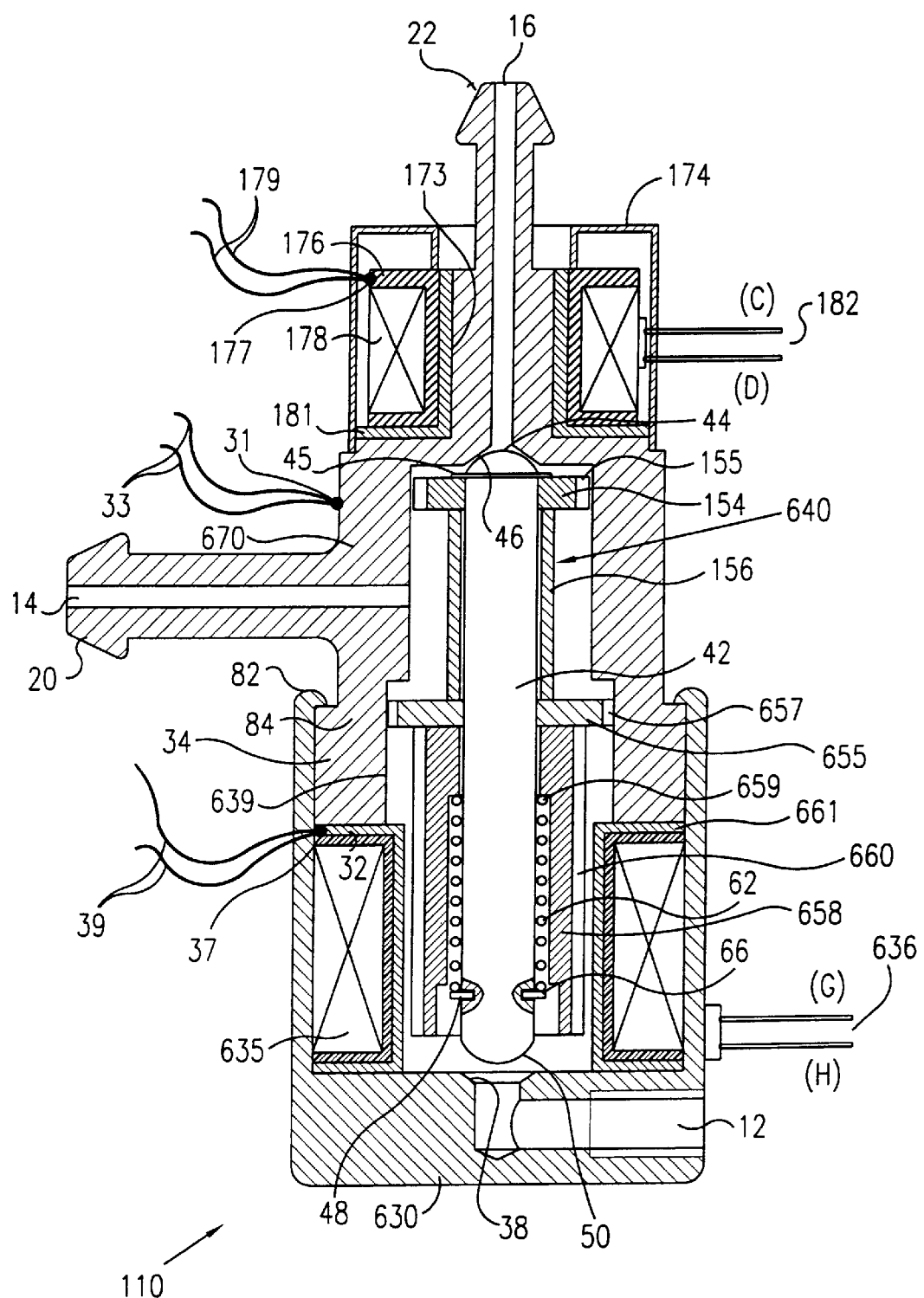
FIG. 19 shows a further embodiment of a valve according to the present invention.

FIG. 19 shows an alternative embodiment of the valve of the present invention. Parts which are identical to those in FIG. 2 are given the same numbers and are not described again. The lower housing sub-assembly is constructed in the same manner as that of FIG. 2, and the plunger subassembly 640 of valve 620 is also constructed in like manner except for the following:

The core 58 is replaced by member 658 which is made of non-ferrous material having conduits 660. Between the plastic member 658 and the hollow cylindrical member 156 is placed a second magnet 655 having grooves 657. Coil 635 replaced coil 35 and is connected to inputs 636, denoted by letters G and H. The lower housing 30 is replaced by a similar housing 630 of non-ferrous material. The upper housing 670 has an inner cylinder 639 in which magnet 655 is able to move axially. Upon coil 635 is in contact with a second ferrous core 661. The device is made to such a size that when the magnet is in the lowest position of its travel, an axial separation remains between the magnet and the second core 661.

In order for the plunder to be lowered and seal the lower port 12 currents are inserted via CD and GH to push the plunger downwards. In order to seal the upper port 16 the currents are simply reversed. For ease of understanding the coil 178 and magnet 154 in the region of port 16 and the corresponding coil and magnet in the region of port 12 are assumed to have the same force displacement characteristics.

The arrangement can be operated in an optimal manner, using a suitably programmed microcontroller, such that one or other coil can be operated with greater strength as necessary for any given displacement.

Figure 20A:
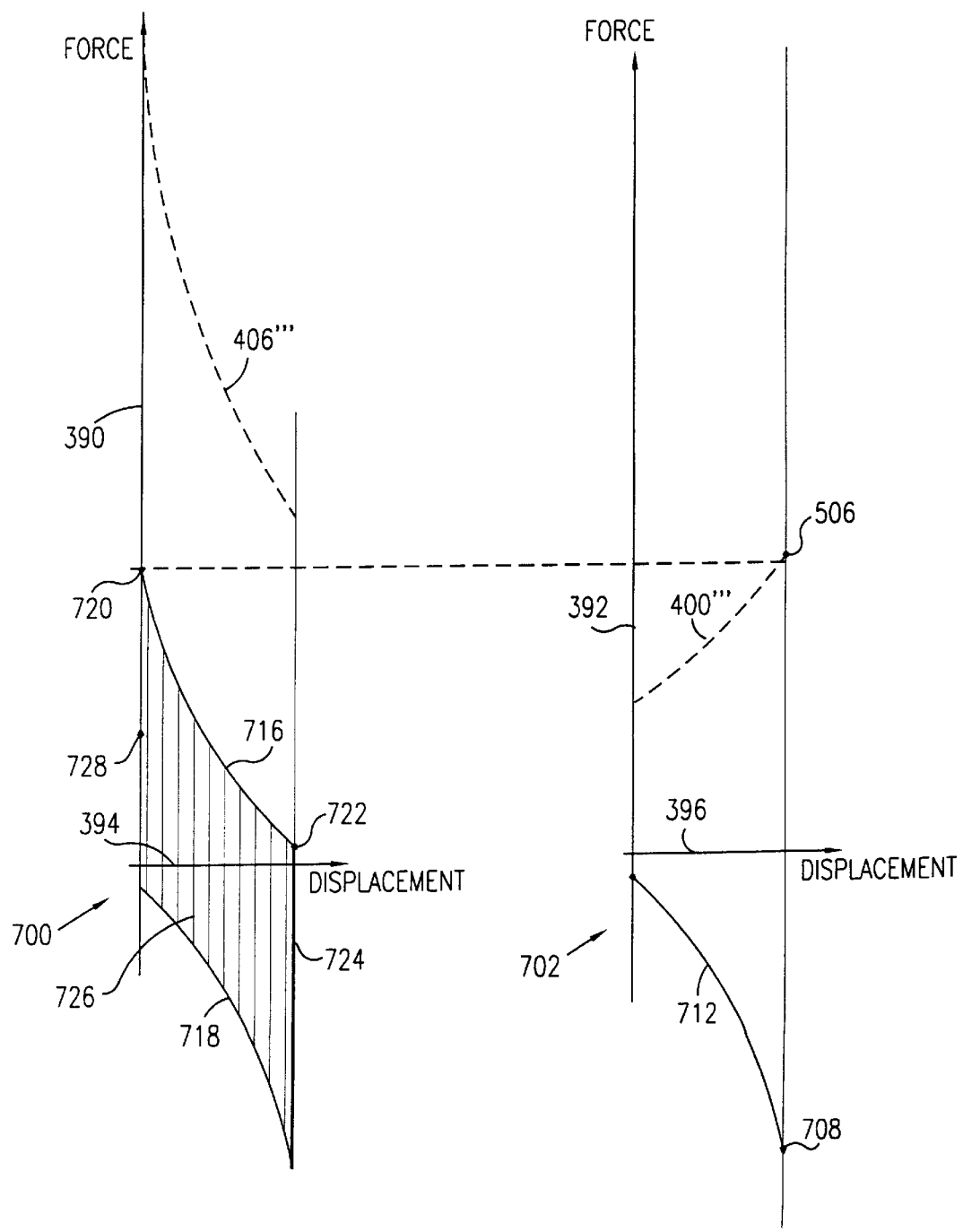
FIGS. 20A and 20B show force displacement curves for the valve of FIG. 19.

FIG. 20A refers to the embodiment of FIG. 19. FIG. 20A is a graph showing how the situation in FIG. 16A is modified if a permanent magnet 655 is mounted on the plunger assembly 6540 and all of the other changes introduced in FIG. 19 are made. Powering of the coil whilst in the unpowered position moves the graph from position 506, the top right hand corner to position 708, the bottom right hand corner which in practice means that a large attractive force is converted into a repulsive force. As the core 658 approaches the lower housing 630, the path of graph 712 is followed leftwards, using a level of current which is for ease of explanation the same in both coils 635 and 178, and graph 516 shows the increasing power of the coil 635 to pull the magnet 655 towards the lower housing 630.

Graph 712 shows the characteristic of the attraction between the permanent magnet 154 and the upper coil 178.

Graph 716 shows the characteristic of the attraction between the permanent magnet 655 and the upper coil 635. The upper left hand point 720 of the graph 716 describes the pull in the downward direction of the coil 635 when the plastic member 658 is at the lowest point of its travel. Intermediate right hand point 722 describes the same force when the core is at the uppermost point of its travel.

The force represented by graph 712 acts together with the force of the coil. The shaded area 726 is between the two graphs 716 and 718 represents the resultant force on the plunger 42 as a function of the displacement. It will be noted that the characteristic 716 is raised somewhat from the characteristic 718 and this gives a reserve of force 724 that powers the initial separation of the plunger assembly 640 from seat 46 when the coil 635 is energized. At all times a relatively large force is available from the coil 635 and this is largely the same value for all displacements.

Point 728 denotes the latching force produced by magnet 655 on core 661 to close port 12.

Figure 20B:
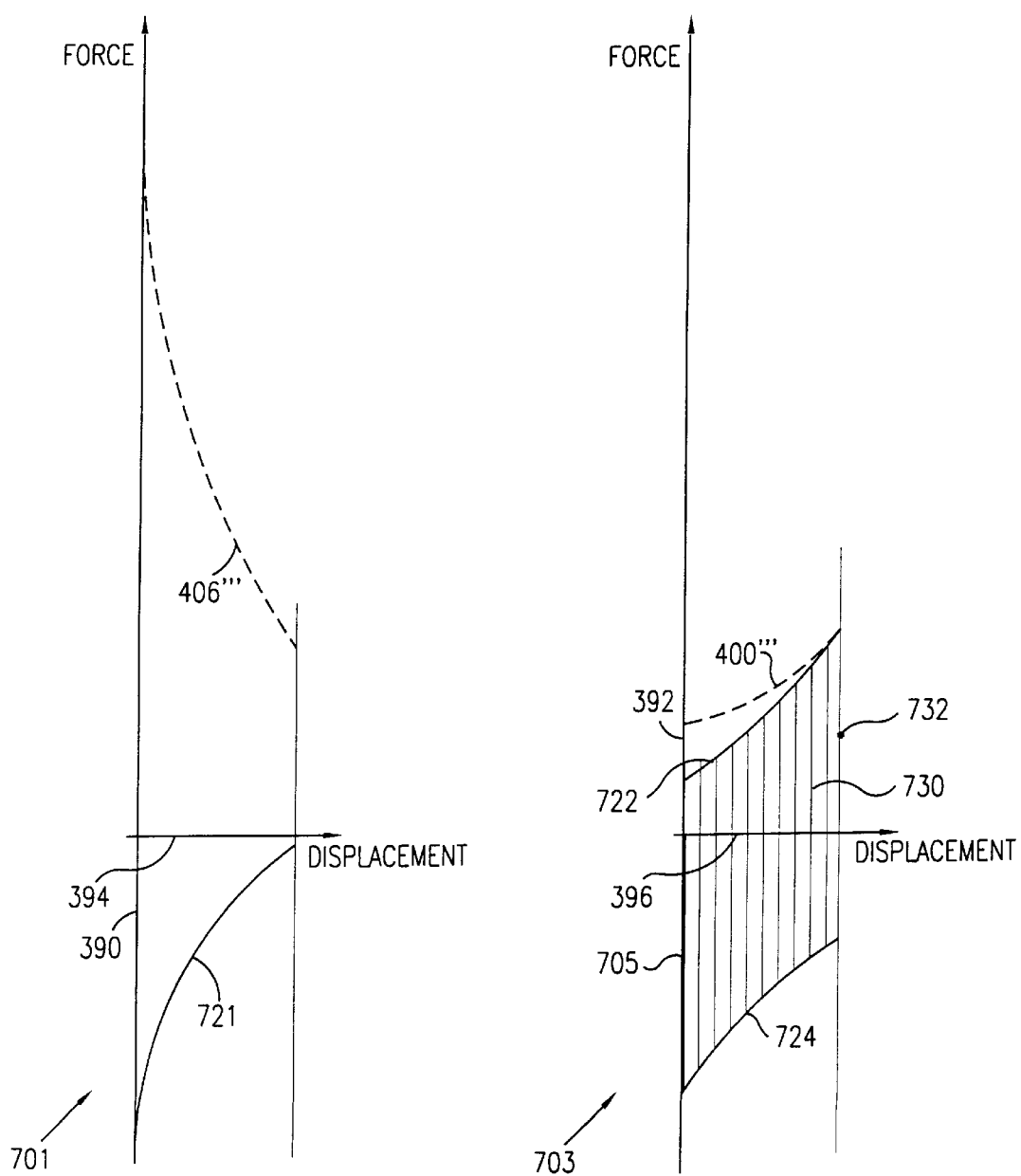

Graphs 400''' and 406''' are the same as graphs 400 and 406 shown in FIG. 14 and are shown for ease of reference.

the above applies in the same way to FIG. 20B which shows displacement towards port 16. The directions of current are reversed and forces are thus exerted in opposite directions. Thus the point 720 is equivalent to 712, 722 is equivalent 716, and 724 to 718, and the shaded areas 730 to 726, the value 732 is equivalent to 728.

Table 1 shows how the microcontroller of FIGS. 18A or 18B is programmable to operate a valve such as the valve 110. Col. 1 indicates the numerical codes assignable to each program. Cols. 2 & 3 show the open (O) and closed (C) status of ports 12 and 16. It will be appreciated that the closed state C under closed loop control may include periodic partial opening of the port as part of the control process. Col. 4 indicates a delay in milliseconds to the operation of connections A and B It will be apparent that he delays may be different for each coil and it will be appreciated that the starting point for each delay may not be the same. Col.'s 5 and 6 show the voltage in connection 36 referred to A and B. Col. 7 indicates, for connection 36, whether the voltage applied varies under closed loop control (Yes) or whether it is set at predetermined fixed levels (No). Col.'s 8 and 9 describe the voltage connections A and B following the time delay. Cols. 10 and 15 indicate the same data for the connections C & D, to the upper coil 178. The closed loop control for the upper coil 178 can change polarity and is thus indicted as +/−.

It will be appreciated that the microcontroller may be programmed in similar manner for operation of the embodiment of FIG. 19. Contacts G and H differ from A and B in that the direction of current is reversible.

TABLE 1

Programming of a microcontroller for FIG. 2 Embodiment

| Code | port 12 statu O/C | port 16 statu O/C | delay mS | A | B | clsd loop ctrl yes/no/off | A | B | delay | C | D | clsd loop ctrl yes no/off | C | D |
| --- | --- | --- | --- | --- | --- | --- | --- | --- | --- | --- | --- | --- | --- | --- |
| 00 | O | C | 0 | 0 | 0 | 0 | 0 | 0 | 0 | 0 | 0 | 0 | 0 | 0 |
| 01 | O | C | 0 | 0 | 0 | 0 | 0 | 0 | 50 | + | − | 0 | 0 | 0 |
| 02 | O | C | 0 | 0 | 0 | 0 | 0 | 0 | 50 | + | − | No | + | − |
| 03 | O | C | 0 | 0 | 0 | 0 | 0 | 0 | 50 | + | − | Yes | +/− | −/+ |
| 04 | C | O | 30 | − | + | No | 0 | 0 | 0 | 0 | 0 | 0 | 0 | 0 |
| 05 | C | O | 0 | 0 | 0 | No | − | + | 0 | 0 | 0 | 0 | 0 | 0 |
| 06 | C | O | 30 | − | + | No | − | + | 30 | − | + | 0 | 0 | 0 |
| 07 | C | O | 0 | 0 | 0 | No | − | + | 50 | − | + | 0 | 0 | 0 |
| 08 | C | O | 0 | 0 | 0 | No | − | + | 50 | − | + | No | − | + |
| 09 | C | O | 50 | − | + | Yes | − | + | 50 | − | + | Yes | −/+ | +/− |

For example in row 3, code 03 sets port 16 to 'closed' by providing 50 mS of maximum voltage at the upper coil 178 and C being positive and D being negative. Following this is a period during which the upper coil 178 is controlled by the closed loop arrangement to maintain the position under varying pressure etc. and this indicated by the symbol +/−s and −/+.

For example in row 9, code 09 sets port to 'closed' with a 30 mS time delay over the lower coil 35. At the same time a supporting polarity is provided to the upper coil 178. Within the 50 mS delay period the valve passes through all of the positions of the curve of FIG. 16A. Following the delay period contacts A and B are brought under closed loop control without any change in polarity, and contacts C and D are brought under closed loop control loop control in such a way that changes in polarity are possible.

In order to improve optimization, the time delays mentioned above for the first coil and the second coil respectively may be staggered so as to minimize the total current that passes through at least one of the coils. Thus, as with the other optimizations mentioned herein therein is an improvement in efficiency and further minimization is possible.

The microcontroller may preferably utilize width modulation PWM. This gives effective control and is widely used in the control field. The skilled man will know of other forms of control and their respective advantages.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will appreciated by persons skilled in the art that the present invention is not limited to a what has been particularly shown and described hereinabove. Rather, the scope of the present invention is defined only by the claims that follow:

What is claimed is:

1. A solenoid valve comprising a first coil; a plunger, at least a first and a second opening in said valve, and a latching mechanism placed in association with the first opening, wherein the latching mechanism causes latching, with a predetermined latching force, of the plunger to the first opening and energisation of the first coil along a predetermined first polarity causes at least a reduction of the latching force, the plunger having a first end towards said first opening and a second end towards said second opening, the first coil being remote from said first end and a magnetic field extensor being provided to extend a first pole of the magnetic field produced by the first coil to said first end of the plunger, the magnetic field extensor comprising a ferrous material member terminated by a ferrous endpiece and being movable with respect to said first opening.

2. A solenoid valve according to claim 1 wherein the latching mechanism comprises a permanent magnet placed in association with the first opening, which permanent magnet serves to provide the latching force, which force is directed towards the first opening, and wherein the first coil is operable to cause said at least a reduction in the latching force and to pull the plunger towards the second opening.

3. A solenoid valve according to claim 2, wherein the first pole of the magnetic field produced by the first coil is of the same polarity as a facing pole of the permanent magnet.

4. A solenoid valve according to claim 3 wherein the first coil acts upon an iron core to force the iron core towards the second opening when the first coil is in an energized state, wherein the plunger is connected to the iron core by a biasing connector, and wherein the biasing connector is operative to bias the plunger towards the second opening.

5. A solenoid valve according to claim 4 wherein said magnetic field extensor comprises a single part integral with said core.

6. A solenoid valve according to claim 5, wherein the hollow cylindrical member is axially slidable with respect to the iron core.

7. A solenoid valve according to claim 3 wherein the first coil acts upon an iron core to force the iron core towards the second opening when the first coil is in an energized state, wherein the plunger is connectable to the iron core by a first biasing connector, and wherein the first biasing connector is operative to bias the plunger against the core towards the second opening.

8. A solenoid valve according to claim 7, when the plunger is further connected to the iron core by a second biasing connector, and wherein the second biasing connector is attached to bias the core downwardly with respect to the plunger such that when both plunger and core are moving upwardly and upward motion of the plunger is arrested suddenly, the said first and said second biasing connectors are operable to cause a cushioned deceleration of the core, and when the core is moving downwardly and the downward motion of the core is arrested, the first biasing connector is operable to cause downward motion of the plunger.

9. A solenoid valve according to claim 8 wherein the biasing connectors are coiled springs whose characteristics are optimized for a required load.

10. A solenoid according to claim 2 wherein a second permanent magnet is provided.

11. A solenoid valve according to claim 1 wherein the first coil is operable to cancel out the latching force.

12. A solenoid valve according to claim 1 wherein the first coil is operable to change the latching force towards the first opening into a bias towards the second opening.

13. A solenoid valve according to claim 1, having a third opening, and fluid paths interruptible by the plunger, between the first opening and the third opening and between the second opening and the third opening.

14. A solenoid valve according to claim 1, wherein the ferrous material member is a hollow cylindrical member.

15. A solenoid valve according to claim 14 wherein the ferrous endpiece is a ring which is mobile with the plunger.

16. A solenoid valve according to claim 14, wherein the hollow cylindrical member is modified in shape to alter the strength of magnetic field transferred therethrough.

17. A solenoid valve according to claim 14 wherein gaps are provided in the hollow cylindrical member to alter the strength of the magnetic field transferred therethrough.

18. A solenoid valve according to claim 1 wherein excitation of the coil is controlled by a microcontroller.

19. A solenoid valve according to claim 1 wherein the first coil is placed in association with said first opening and the latching mechanism comprises a magnet mounted on said plunger.

20. A solenoid valve according to claim 19 wherein the first coil is engergisable in a second polarity to increase the latching force.

21. A solenoid valve according to claim 19 wherein a second coil is provided around the plunger, energisable to draw the plunger towards the second opening.

22. A solenoid valve according to claim 21 wherein energisation of the coils is provided using a three-way switch connected directly to the second coil and via diodes to the first coil, the arrangement permitting in a first switching position, energisation of the first coil alone in a first direction, in a second switching position, energistaion of the first coil and the second coil both in a second direction and in a third position not permitting energisation of either coil.

23. A solenoid valve according to claim 19 wherein the plunger has a first end towards said first opening and a second end towards said second opening, and wherein said magnet is a permanent magnet mounted on the first end of said plunger.

24. A solenoid valve according to claim 23 having a housing, wherein said first coil is mounted on said housing about said first opening and wherein said first coil is operable upon energisation in a first polarity to produce a pole facing said permanent magnet which is of the same polarity as a pole produced by said permanent magnet facing said coil, thereby pushing said plunger towards said second opening, and upon energisation in a second polarity is operable to produce a pole facing said permanent magnet which is of the opposite polarity as a pole produced by said permanent magnet facing said coil, thereby pulling said plunger towards said first opening.

25. A solenoid valve according to claim 19 wherein excitation of the first coil is controlled by a microcontroller.

26. A solenoid valve according to claim 25 wherein the microcontroller is programmable and contains a plurality of prestored programs for controlling operation of the valve.

27. A solenoid valve according to claim 25 wherein the microcontroller is in turn controllable by a computer.

28. A solenoid valve according to claim 25 wherein individual programs may be selected using external switches mounted on the microcontroller.

29. A solenoid valve according to claim 25 wherein the microcontroller is a PWM controller.

30. A solenoid valve according to claim 25 wherein the microcontroller provides closed loop control for one of the group comprising temperatures of the coils, fluid pressure at at least one of the ports and flow rate of fluid within the fluid paths.

31. A solenoid according to claim 30 wherein the microcontroller is operable to provide timing control for excitation of the coils, wherein the timing control includes the introduction of time delays into the operation of each coil and wherein the time delays are the same for each coil.

32. A solenoid valve according to claim 30 wherein the microcontroller is operable to provide timing control for excitation of the coils, wherein the timing control includes the introduction of time delays into the operation of each coil and wherein the time delays are different for each coil.

33. A solenoid according to claim 32 wherein the polarity of each coil is reversible.

34. A solenoid according to claim 30 wherein the microcontroller is operable to provide timing control for each coil and wherein timing delays for each coil start at different time instants.

35. A solenoid valve according to claim 25 wherein the excitation of the coil is increasable.

36. A solenoid valve according to claim 25 wherein the excitation level of the coil is variable.

37. A solenoid valve according to claim 19 wherein a second permanent magnet is provided.

38. A solenoid valve according to claim 19 having a temperature sensor on the first coil.

39. A solenoid valve according to claim 19 having a temperature sensor on its outside.

40. A solenoid valve according to claim 1, wherein there is further provided a second coil placed in association with the first opening and which is energisable in both a first polarity and a second polarity and which, when energized in the first polarity is operable to bias the plunger away from the first opening, and when energized in the second polarity is operable to bias the plunger towards the second opening.

41. A solenoid valve according to claim 40 wherein the second coil acts upon an iron core to force the iron core towards the second opening when the second coil is in an energized state, wherein the plunger is connected to the iron core by a biasing connector, and wherein the biasing connector is operative to bias the plunger against the core towards the second opening.

42. A solenoid valve according to claim 41 wherein the plunger is further connected to the iron core by a second biasing connector, and wherein the second biasing connector is attached to bias the core downwardly with respect to the plunger such that when both plunger and core are moving upwardly and upward motion of the plunger is arrested suddenly, the two biasing connectors are operable to cause a cushioned deceleration of the core, and when the core is moving downwardly and the downward motion of the core is arrested, the first biasing member is operable to cause downward motion of the plunger.

43. A solenoid valve according to claim 42 having a plunger extendible from the core to be receivable in a seat of the second opening.

44. A solenoid valve according to claim 43 wherein the extension of the plunger is increased over that necessary to be receivable in the seat of said second opening.

45. A solenoid valve according to claim 42 wherein the characteristics of the two biasing connectors are preselected to reduce impact damage to the plunger and to the seats.

46. A solenoid valve according to claim 1, wherein a resultant of forces acting on said plunger is substantially constant over motion of said plunger.

47. A solenoid valve according to claim 1 wherein said ferrous member has a double motion comprising a sliding motion part and a free motion part.

48. A solenoid valve according to claim 47, wherein said ferrous member is movable to reshape an electromagnetic field formed by said solenoid.

* * * * *